United States Patent
Dent et al.

(10) Patent No.: US 8,351,874 B2
(45) Date of Patent: Jan. 8, 2013

(54) SYSTEM AND METHOD FOR ADAPTIVE ANTENNA IMPEDANCE MATCHING

(75) Inventors: Paul Wilkinson Dent, Pittsboro, NC (US); Sven Mattisson, Bjärred (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 886 days.

(21) Appl. No.: 12/099,550

(22) Filed: Apr. 8, 2008

(65) Prior Publication Data
US 2009/0253385 A1 Oct. 8, 2009

(51) Int. Cl.
H03C 1/52 (2006.01)
(52) U.S. Cl. ............. 455/107; 455/126; 455/115.2; 455/69; 455/73; 455/550.1; 455/125; 330/129; 330/51; 330/151; 330/130; 330/149; 330/132
(58) Field of Classification Search ........... 455/550.1, 455/73, 121, 105–107, 129, 115.1, 69, 125, 455/127, 126, 115.5, 127.1, 522.1, 80, 82, 455/114.2, 115.2; 375/130, 312, 219; 330/129, 330/51, 207, 130, 149, 151
See application file for complete search history.

(56) References Cited

U.S. PATENT DOCUMENTS

| | | | |
|---|---|---|---|
| 5,241,702 A | 8/1993 | Dent | |
| 5,423,082 A * | 6/1995 | Cygan et al. | 455/126 |
| 5,542,096 A * | 7/1996 | Cygan et al. | 455/115.2 |
| 5,568,520 A | 10/1996 | Lindquist et al. | |
| 5,614,904 A | 3/1997 | Dent | |
| 5,749,051 A | 5/1998 | Dent | |
| 5,834,987 A | 11/1998 | Dent | |
| 6,845,126 B2 | 1/2005 | Dent et al. | |
| 6,961,368 B2 | 11/2005 | Dent et al. | |
| 7,058,368 B2 * | 6/2006 | Nicholls et al. | 455/114.2 |
| 7,826,808 B2 * | 11/2010 | Faulkner | 455/114.2 |
| 2002/0101907 A1 * | 8/2002 | Dent et al. | 375/132 |
| 2003/0193997 A1 * | 10/2003 | Dent et al. | 375/219 |
| 2005/0025218 A1 * | 2/2005 | Briles | 375/130 |
| 2005/0042989 A1 | 2/2005 | Ho | |
| 2009/0130990 A1 * | 5/2009 | Rofougaran | 455/73 |

FOREIGN PATENT DOCUMENTS

| | | |
|---|---|---|
| DE | 10317599 A1 | 8/2004 |
| WO | 2004/098076 A1 | 11/2004 |

* cited by examiner

Primary Examiner — Jungpeng Chen
(74) Attorney, Agent, or Firm — Coats & Bennett, P.L.L.C.

(57) ABSTRACT

Methods and apparatus are disclosed for automatically adjusting antenna impedance match in a wireless transceiver employing phase-amplitude modulation. According to some embodiments of the invention, a wireless transceiver comprises a transmitter circuit and a receiver circuit connected to the antenna by a transmit/receive duplexer. An electronically adjustable matching network is located between the transmitter output and the antenna. To control the adjustable matching network, a directional coupler is located between the transmitter output and the matching network to separate transmit signals reflected from the antenna system, including the antenna, the matching network and the T/R duplexer. The reflected transmit signals are routed to the receiver circuit, which digitizes the reflected signal and determines an antenna reflection coefficient based on the digitized reflected signal and the modulation signal used to create the transmit signal. The complex antenna reflection coefficient is used to determine any adjustment needed to the antenna matching network.

24 Claims, 13 Drawing Sheets

SYSTEM AND METHOD FOR ADAPTIVE ANTENNA IMPEDANCE MATCHING

This application is related to the subject matter of U.S. Pat. No. 6,845,126, filed Apr. 25, 2003 and issued Jan. 18, 2005, to Dent et al. (the "'126 patent"), and to U.S. Pat. No. 6,961,368 filed Jan. 26, 2001 and issued Nov. 1, 2005, also to Dent et al. (the "'368 patent"). The entire contents of both of these related applications are hereby incorporated by reference herein.

TECHNICAL FIELD

The present invention generally relates to wireless communication devices and particularly relates to circuits and methods for adaptively matching transceiver circuits to varying antenna impedances.

BACKGROUND

Automatic Antenna Tuning Units (ATUs) are well known in the field of High Frequency (HF) (2-30 MHz) radio transceiver design, where radios and antennas must be designed to operate over wide frequency bands. High frequency ATUs are typically designed to handle high power levels, such as one kilowatt, and may utilize, for example, motor-driven variable capacitors and inductors that are capable of withstanding many kilovolts of RF (Radio Frequency) voltage and many amps of current. Such ATUs are, however, bulky, expensive, and operationally slow.

A typical HF ATU operates by initiating a tuning phase after a change to the transmitter operating frequency. During the tuning phase, a carrier signal, often unmodulated, is transmitted while the ATU adjusts the variable circuit elements and searches for the minimum VSWR (Voltage Standing Wave Ratio) condition. (As is well known in the art, VSWR is one way to express impedance mismatch, which causes signal reflections in a circuit.) The status of the ATU is then frozen until the next frequency change or until manual re-initiation of the tuning phase.

In other frequency bands, such as the Very High Frequency (VHF) band (30-100 MHz), the antenna Q (quality)-factors are generally much less than those found in HF antennas. As a result, VHF ATUs may be made using step-tuned inductors or capacitors, with associated relays or PIN diodes for switching in or out the correct combination of components. Typically, a set of switch commands are pre-determined for each frequency channel and stored in a read-only memory. These switch commands select the correct combination of matching components. Thus, upon a change in frequency, the stored switch commands can be retrieved from the memory for the new frequency channel and used to operate the various switches.

This type of antenna matching permits frequency hopping radios to be made where the antenna is tuned for each new hop frequency. The antenna tuning typically occurs in a time period between each new frequency hop during which no transmission takes place. This time period is typically known as the guard time. However, in prior art frequency hopping, an impedance mismatch observed on a previous frequency hop is generally uncorrelated with the mismatch seen on a later frequency hop. The stored tuning commands for the subsequent frequency hop are simply retrieved from memory to switch in or out the correct combination of matching components. In other words, there is no adaptive correction based on previous mismatches.

In current applications, wireless communication devices, such as cellular phones, must operate at various frequencies in the RF, HF, VHF, UHF (Ultra-High Frequency) or low microwave bands to transmit and receive signals in, for example, a Time Division Multiple Access (TDMA) network. Absent a tuning device, the antenna impedance observed by the transceiver circuits is a function of the operating frequency, and may also vary substantially depending upon the proximity of the antenna to the human body. Therefore, it may be insufficient to determine fixed matching commands for the various channel frequencies, such as in conventional frequency hopping radios, due to the varying proximity of the cellular phone, and hence the antenna, to a user's body. Furthermore, the proximity of the cellular phone to the user's body may vary during a call, necessitating the detection and correction of a resultant impedance change without interrupting the call or otherwise distorting the signal. There is therefore a need for very small, low-cost, adaptive antenna matching techniques that are capable of operating continuously during normal transceiver use.

In the above-referenced patents, methods are disclosed for using a transceiver's receiver section during active signal transmissions to evaluate the complex antenna reflection coefficient. These methods further include adapting antenna matching components in response to this evaluation. These previously described methods may be conveniently implemented in transceivers utilizing a homodyne receiver, where the phase- or frequency-modulated transmit signal may be used as the local oscillator for the homodyne receiver. In such an arrangement, the phase or frequency modulation on the reflected transmitter signal cancels with the same modulation on the receiver local oscillator. Thus, measurements of the antenna reflection are automatically compensated for the transmitter phase modulation.

More recently, linear modulation, comprising both phase and amplitude modulation, has entered common use as a way of achieving improved communications capacity, system flexibility, and/or higher data rates. In transceivers utilizing such phase-amplitude modulation schemes, antenna reflection measurements using the previously disclosed methods do not yield results that are automatically compensated for the transmitter modulation. Accordingly, there is a need for an improved method of measuring antenna reflection, compensated for advanced modulation schemes, as well as for providing periods during which the receiver is not employed for receiving user data which may be re-employed for such compensated measurements.

SUMMARY

Disclosed herein are methods and apparatus for automatically adjusting an antenna impedance match in a wireless transceiver. The techniques described may be adapted for any of a variety of phase-amplitude modulation schemes and wireless protocols, including CDMA and OFDM.

According to some embodiments of the invention, a wireless transceiver comprises a transmitter circuit and a receiver circuit connected to the antenna by a transmit/receive duplexer, which may be a duplexing filter or alternatively can be a transmit/receive switch. An electronically adjustable matching network may be located anywhere in the path between the transmitter output and the antenna. For example, the adjustable network in one implementation is located between the antenna and the duplexer so as to be operable in both the transmit and the receive paths, while in another implementation, the adjustable matching network is located between the transmitter output and the duplexer so as to be operable only in the transmit path.

To control the adjustable matching network, a directional coupler is located between the transmitter output and the matching network to separate transmit signals reflected from the antenna system, including the antenna, the matching network and the T/R duplexer. The reflected transmit signals are then routed to the receiver circuit itself, which may comprise a direct conversion or homodyne receiver, the local oscillator for which is also used as the transmit carrier frequency signal source. The receiver digitizes the reflected signal and then digitally processes it using knowledge of the transmit modulation and calibration information in order to determine the complex antenna reflection coefficient. The complex antenna reflection coefficient is then used to determine any adjustment needed to the antenna matching network.

In some embodiments, the wireless transceiver is a mobile phone conforming to the 3G standard known as UMTS or WCDMA, in which a "slotted mode" or "compressed mode" is available to allow the receiver to be employed for the purposes of this invention while not receiving user data. In other implementations, the transceiver may conform to the cellular data standard known as EDGE, or to a WLAN standard such as 802.11 or WiMax, or to several standards in the same equipment.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
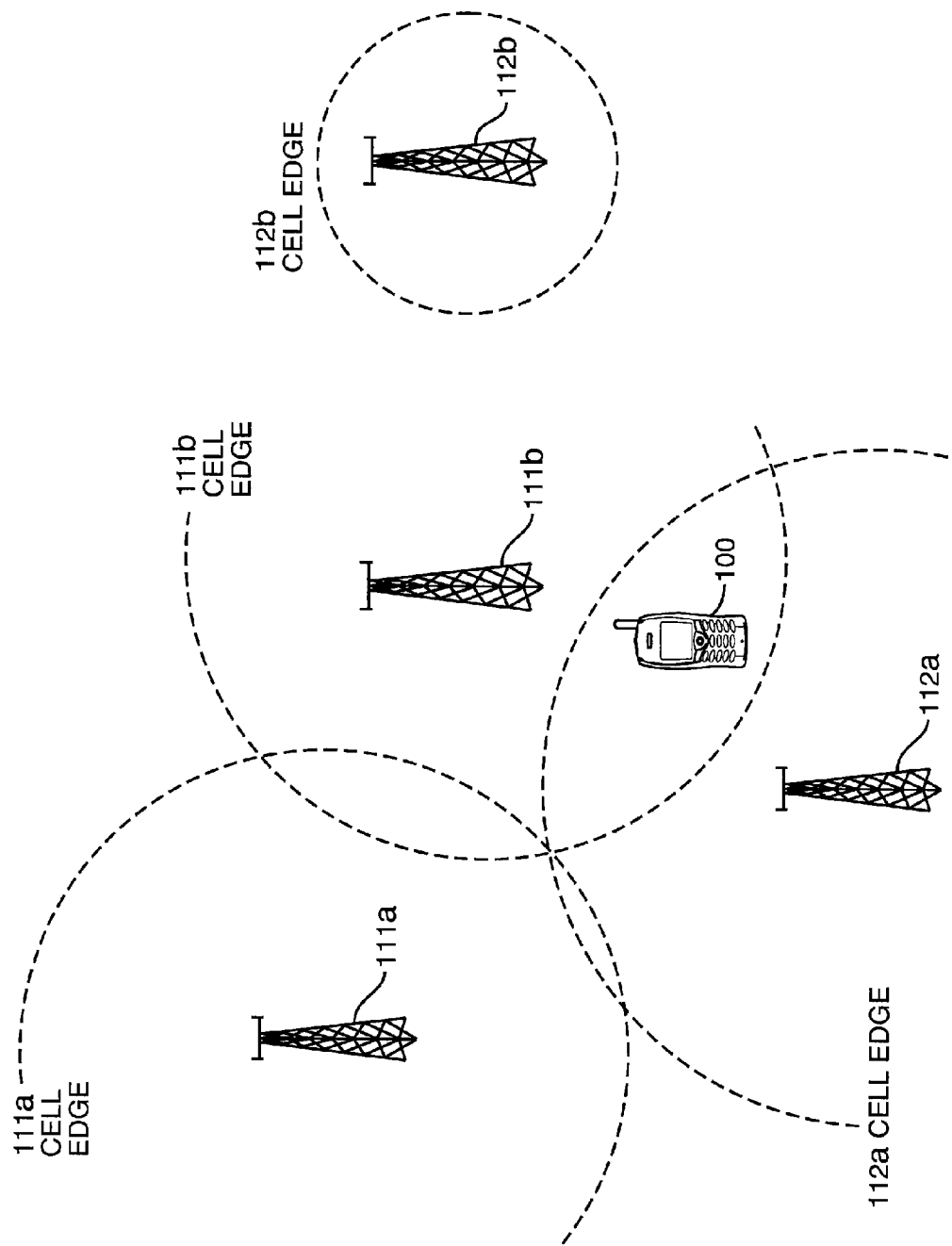
FIG. 1 illustrates an exemplary communication system.

FIG. 1 illustrates a wireless communication device 100 operating in a cellular network including first 111a, 111b and second 112a, 112b base stations. The first base stations 111a, 111b transmit and receive signals using a first pair of spaced frequency bands, while the second base stations 112a, 112b transmit and receive signals using a second pair of spaced frequency bands different from the first pair of spaced frequency bands. Thus, the base stations 111a, 111b, 112a, and 112b utilize Frequency-Division Duplexing (FDD), in which the forward link (base station to mobile station) and reverse link (mobile station to base station) transmissions are separated by frequency.

As shown in FIG. 1, wireless communication device 100 (which may be a portable cellular phone) is located within the cell range of both base station 112a and base station 111b. When the cellular phone 100 is equipped to communicate via either the first base stations 111a, 111b (using the first pair of spaced frequency bands) or the second base stations 112a, 112b (using the second pair of spaced frequency bands), the cellular phone 100 is known as a "dual-band" phone. Multi-band phones (communicating in more than two pairs of spaced frequency bands) are also known. In some embodiments of a dual-band or multi-band phone, one of the spaced frequency band-pairs may be used for communicating via an orbiting satellite(s).

In addition, some mobile communication systems use a single frequency band that is time-shared between the forward link and reverse, a technique known as single-frequency Time-Division Duplex (TDD). Single-frequency TDD has been considered for a Chinese CDMA system, the OFDM system known as WiMax, and other standards-based communications technologies, and is currently specified for one operating mode of the Long Term Evolution (LTE) system under development by the $3^{rd}$-Generation Partnership Project (3GPP).

Figure 2:
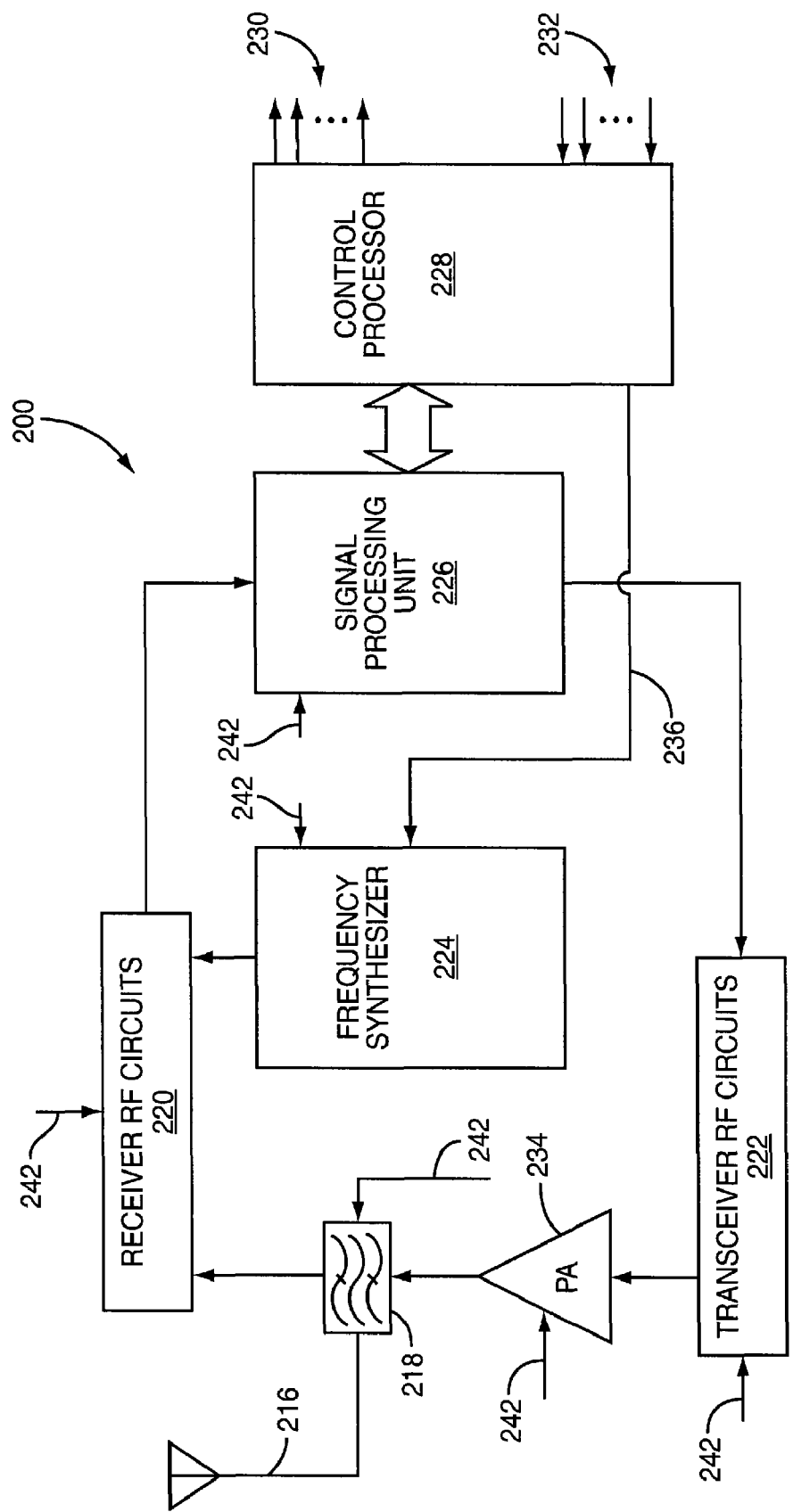
FIG. 2 is a block diagram of a conventional cellular phone.

FIG. 2 is a block circuit diagram of a conventional cellular phone, shown generally at 200, which may be a simple, single-band phone. The cellular phone 200 includes an antenna 216, a duplexing circuit 218, receiver RF (Radio Frequency) circuits 220, transmitter RF circuits 222, a frequency synthesizer 224, a signal processing unit 226 and a control processor 228. Signals received at the antenna 216 are fed to the receiver RF circuits 220 via the duplexing circuit 218. The signals output by the receiver RF circuits 220 are received by the signal processing unit 226 and conventionally processed. The processed received signals are fed to the control processor 228, which analyzes the signals and directs them, at signal lines 230, to conventional man/machine interface devices (not shown), such as transducers, speakers, visual displays, etc.

Signals for transmission are received at signal lines 232 by the control processor 228. Such signals may be generated by conventional man/machine interface devices (not shown), such as transducers, microphones, keypad entry, etc. The signals for transmission are fed to the signal processing unit 226 for conventional processing and then to the transmitter RF circuits 222. A power amplifier 234 amplifies the transmission signals from the transmitter RF circuits 222. The amplified transmission signals are fed to the antenna 216 via the duplexing circuit 218 and transmitted over the cellular, or other wireless, network. The frequency synthesizer 224 receives a frequency control signal 236 from the control processor 228 and conditions the receiver RF circuits 220 and the transmitter RF circuits 222 to receive and transmit, respectively, on selected channels. The control processor 228 includes both program and data memory and generates conventional control signals 242 for controlling operation of the respective device.

In wireless phones using Frequency Division Duplexing (FDD), the duplexer circuit 218 includes duplexing filters permitting the wireless phone to receive and transmit simultaneously. Two examples of wireless phones capable of receiving and transmitting simultaneously include analog FM-AMPS (Advanced Mobile Phone Systems) phones and CDMA (Code Division Multiple Access) phones such as IS-95 phones. In Time-Division Multiple Access (TDMA) wireless phones using Time Division Duplexing (TDD), however, duplexing circuit 218 may comprise a transmit/receive (T/R) switch that alternately connects the transmitter 222 and receiver 220 RF circuits to the antenna 216. Such alternate transmit and receive connection is possible in TDMA wireless phones since transmission and reception occur in alternate bursts, or time slots, and not simultaneously. Examples of such TDMA/TDD phones include phones operating according to the European GSM (Global System for Mobile Communications) standard, also known in the United States as PCS (Personal Communication Services), and phones operating according to the standard known as D-AMPS (Digital Advanced Mobile Phone System) or IS-136.

Figure 3:
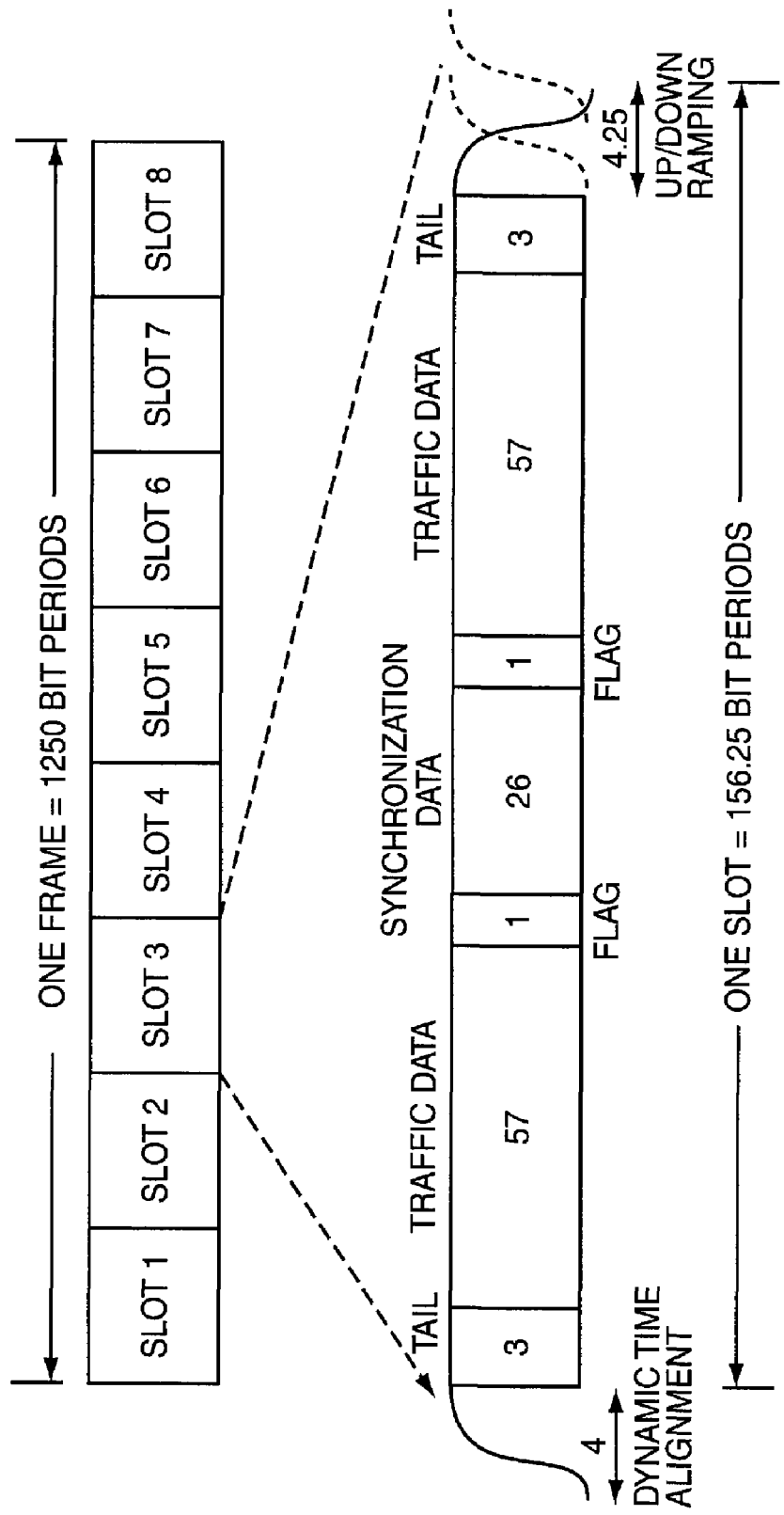
FIG. 3 illustrates a typical Time Division Multiple Access signal waveform and slot format.

FIG. 3 illustrates a typical TDMA signal waveform frame and slot format. A full-rate TDMA burst, or frame, includes 1250 symbol or bit periods, which are divided into eight time slots of 156.25 bit periods each. The transmit and receive frame periods for each mobile phone are staggered in time relative to one another, with each transmit and receive frame period occupying one time slot. A gap of 1.5 time slots occurs between each respective receive and transmit time slot, with a gap of 4.5 time slots occurring between each respective transmit and receive time slot. For example, if a mobile phone is allocated transmit slot 4 for transmission, its corresponding allocated receive slot, shown at 310, would occupy the latter half of slot 1 and the beginning half of slot 2, which are used for transmission by different mobile phones. The 1.5 slots of idle time between the respective receive and transmit slots are utilized for actions like changing the channel frequency synthesizer (224 in FIG. 2) from receive to transmit, or changing the T/R switch (218 in FIG. 2) from receive to transmit. When only one transmit and one receive slot is allocated per frame, for example, for a relatively low data rate service such as voice, a gap of 4.5 slots exists between the end of the transmit slot and the next receive slot. So, in the example where the mobile phone is allocated slot 4 for transmission, the next receive slot for that particular mobile phone would be in the latter half of slot 1 and the beginning slot of 2 of the next frame. This gap of 4.5 slots is often used for mobile assisted handover (MAHO) measurements, such as momentarily tuning the receiver to a neighboring base station to perform a signal strength assessment to determine when a handoff to that neighboring base station would be appropriate. The division of the waveform into a frame and slot format, and the allocation of different time slots for receiving and transmitting, allows ingenious use of the idle time between the respective receive and transmit slots to simplify the mobile phone or otherwise improve the system performance.

FIG. 3 also illustrates the bit placement within a slot, showing slot 3 in expanded exemplary form. Each slot format includes 114 (57+57) bits of traffic data, 2 (1+1) flag bits of control data, 6 (3+3) tail bits to allow the receive filters to ring down and the channel echos to die, and 26 bits of known synchronization data. Each slot format further includes 4 bit periods of dynamic time alignment and 4.25 bit periods of inter-slot guard time where transmitter up/down ramping may take place. As shown in FIG. 3, there is some overlap of the 4.25 bit up/down ramping periods between slots. In some embodiments of the current invention, antenna impedance adjustments may be made at any time after the 4.25 bits of transmit down ramping and before the next transmit upramping, while avoiding making any adjustments during the slot period allocated for reception. Although it may be preferred in some embodiments that antenna impedance adjustments be made during the 1.5 slots of idle time between the receive and transmit slots, adjustments may be made at any time during the idle periods. Further, while several of the adjustable matching networks described herein are described in the context of a TDMA system, those skilled in the art will appreciate that various embodiments of the adjustable matching networks and impedance matching techniques disclosed herein may be utilized in any communications system having idle periods where the mobile device is neither receiving nor transmitting.

One aim of the circuits and techniques disclosed herein is to obtain an accurate transmitter-to-antenna impedance match for signal transmissions, thereby improving transmitter linearity and efficiency without resorting, for example, to the use of ferrite isolators. Linearity is particularly important when high order symbol constellations such as linear 8-PSK or 16- or 64-QAM are used.

Those skilled in the art will appreciate that the characterization and adjustment operations disclosed herein may also be applied to receiver impedance matching. However, because it is more difficult to measure antenna mismatches in the receive state, providing independent antenna tuning for reception in a receive frequency band different than the transmit frequency band may require determination of the appropriate tuning parameters for the receiver/antenna matching from the adaptively determined transmit frequency codes. Alternatively, a predetermined set of fixed tuning parameters for the receiver/antenna matching may be used. Those skilled in the art will also appreciate that separately adjusting an impedance matching circuit for receive and transmit operations in a TDMA environment increases the number of switching cycles of tuning components within the adjustment circuit, which may result in switch longevity concerns. Present-day Micro Electronic Machines (MEMS), which may be used to switch tuning components within an impedance matching circuit, demonstrate impressive longevity compatible with such frequency switching operations, and may thus be a preferred choice in some embodiments.

Figure 4:
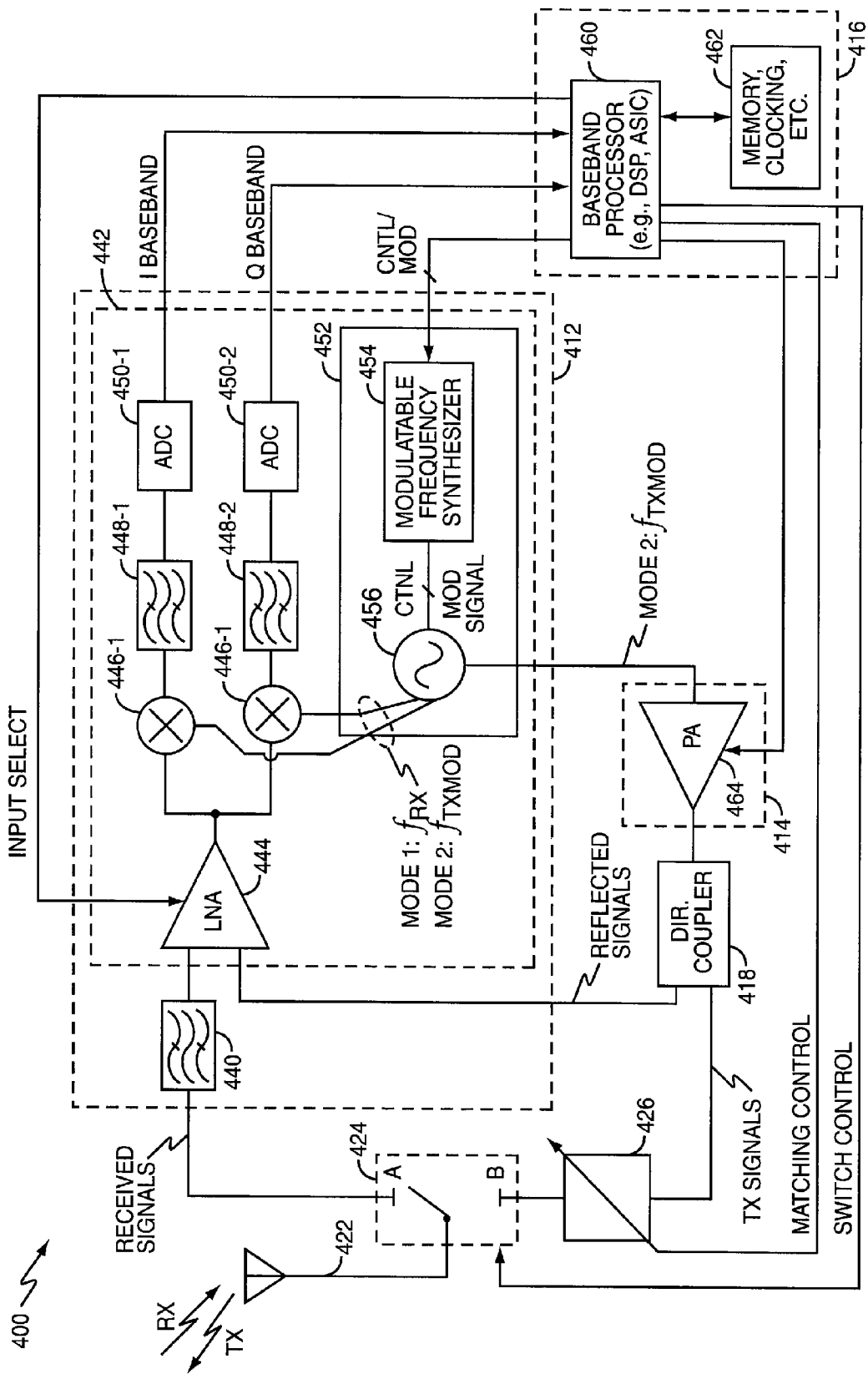
FIG. 4 is a block diagram illustrating a wireless transceiver including an adjustable antenna matching network.

FIG. 4 illustrates a single-band transceiver 400. A similar transceiver was disclosed in the above-referenced '126 patent. A description of the operation of transceiver 400 is repeated here by way of introduction to the further developments described later.

Transceiver 400 includes a homodyne receiver circuit 412, comprising a receive filter 440 and a homodyne downconverter circuit 442, which includes in-phase (I) and quadrature (Q) downconversion signal paths comprising frequency mixers 446-1 and 446-2, baseband filters 448-1 and 448-2, and analog-to-digital-converters (ADCs) 450-1 and 450-2. Converter circuit 442 further includes a local oscillator circuit 452, which comprises a "modulatable" frequency synthesizer 454 and a voltage-controlled-oscillator (VCO) 456.

U.S. Pat. No. 5,834,987, issued on Nov. 10, 1998 to applicant Dent of the instant application, and entitled "Frequency synthesizer systems and methods for three-point modulation with a DC response," discloses an exemplary modulatable frequency synthesizer, and is incorporated herein by reference. Additionally, exemplary but non-limiting homodyne receiver details may be found in the following U.S. patents to applicant Dent et al., which are incorporated by reference herein: U.S. Pat. No. 5,241,702, "D.C. offset compensation in a radio receiver"; U.S. Pat. No. 5,614,904, "Balance companded delta conversion for homodyne receiver"; U.S. Pat.

No. 5,568,520, "Slope drift and offset compensation in zero-IF receivers"; and U.S. Pat. No. 5,749,051, "Compensation for second order intermodulation in a homodyne receiver".

Referring once more to FIG. 4, processing circuit 416 includes baseband processor 460, which may comprise one or more microprocessors, ASICs, FPGAs, or other digital logic devices, and which cooperates with supporting circuits 462, such as clocking/timing control circuits, I/O interface circuits, and one or more memory devices, such as EEPROM or FLASH memory, to store instructions and calibration data, etc., as needed or desired. Finally, transmitter 414 is illustrated as comprising a power amplifier (PA) circuit 464, which is used to amplify a transmit signal to a level appropriate for transmission from antenna 422.

As was explained earlier, receiver 412 is used to downconvert received signals, i.e., remotely transmitted signals, to baseband during receive operations, and is used to downconvert reflected transmit signals to baseband during transmit operations. Here, downconverter circuit 442 includes an input amplifier 444 that has selectable inputs, one input being coupled to receiver filter 440 to receive the antenna-received signals for downconversion, and one input being coupled to directional coupler 418 to receive the antenna-reflected signals for downconversion. Processor 460 generates or otherwise controls an input select signal that determines which input of amplifier 444 is selected.

The amplified signal output by amplifier 444 splits into I and Q downconversion signal paths. Thus, mixers 446-1 and 446-2 mix the amplified signal from amplifier 444 down to baseband using a mixing frequency signal supplied to them by local oscillator circuit 452. In support of this, baseband processor 460 commands local oscillator circuit 452 to generate a receive-frequency signal at the assigned receive channel frequency for output to mixers 446 such that the antenna-received signals are downconverted to baseband I and Q signals. The output signals from mixers 446 pass through baseband filters 448-1 and 448-2 and are then digitized into a stream of I/Q baseband signal samples by ADCs 450-1 and 450-2. Processor 460 thus receives the digitized I/Q sample streams as its baseband receive signal.

Thus, in a first mode of operation, homodyne receiver 412 converts an antenna-received signal on a selected receive channel frequency to a suitable form for processing, such as (I/Q) complex baseband samples in Cartesian format. This conversion enables processor 460 to recover transmitted data and control information conveyed by the received signal. In a second mode of operation, which may be a "transmit" mode for transceiver 410, baseband processor 460 controls switch 424 such that the transmitter 414 is coupled to antenna 422 through directional coupler 418 and impedance matching circuit 426, and controls amplifier 444 such that it amplifies the antenna-reflected signals provided to receiver 412 via coupler 418. Use of the dual-input amplifier 444 allows feedback of the antenna-reflected signals to bypass the receive band pass filter 440, which generally passes the receive frequency band while rejecting signals at the transmit frequency band.

Where transmitter 414 is required to transmit only constant envelope signals modulated purely in phase or frequency, such as GMSK signals according to the GSM standard, the modulated transmit signal may be produced by re-tuning local oscillator circuit 452 to the desired transmit channel frequency and providing a transmit modulation signal to frequency synthesizer 454. Thus, in an exemplary embodiment, processor 460 generates a modulation control signal based on desired transmit signal information and provides that signal to local oscillator circuit 452.

With such an arrangement, local oscillator circuit 452 outputs a pre-amplified version of the modulated transmit signal to mixers 446-1 and 446-2 of downconverter circuit 442 for use in downconverting the antenna-reflected transmit signals, and also outputs the pre-amplified modulated transmit signal to transmitter 414, which uses power amplifier circuit 464 to amplify the modulated transmit signal to a level suitable for transmission from antenna 422. With mixers 446 being driven by the pre-amplified version of the modulated transmit signal, their downconversion operations are coherent with the antenna-reflected transmit signal, meaning that downconversion substantially removes or otherwise "cancels" transmit signal modulation components from the downconverted baseband signals output by receiver 412 during the second mode of operation. Removal of the transmit signal modulation simplifies processing of the baseband signals to obtain a characterization of impedance mismatch.

Baseband processor 460 of processing circuit 416 thus provides impedance matching control signals to matching network 426 based on its processing of the baseband signals obtained from the receiver's downconversion of the antenna-reflected transmit signals. As noted, processor circuit 460 comprises, or otherwise includes, digital signal processing resources used to characterize the impedance mismatch between transmitter 414 and antenna 422 based on processing the baseband signals derived from the antenna-reflected signals.

In at least one embodiment, processor 460 characterizes the impedance mismatch during or just after transmission and then changes or adapts the matching circuit 426 sometime before the next transmission. Ideally, such matching changes are made when the transceiver is not actively transmitting or receiving. Periods when neither the transmitter 414 nor the receiver 412 are active exist, for example, in the guard times between TDMA bursts.

The quality of the impedance match achieved by controlling matching circuit 426 may be assessed by evaluating the signal reflected back to the power amplifier circuit 464. Directional coupler 418 separates forward and reflected signals and routes the reflected signal to an input of homodyne receiver 412, as detailed above. During transmit mode, processor 460 controls downconverter circuit 442 to select the antenna-reflected signal input for downconversion and further sets the local oscillator circuit 452 to the desired transmit frequency. Processor 460 then drives local oscillator circuit 452 with a modulation signal that represents desired transmit signal information, such as a phase-modulation information corresponding to desired control and data signaling.

Thus, as was noted above, the local oscillator signal presented to homodyne downconverters 446-1 and 446-2 is coherent with the transmit signal output from transmitter 414, such that reflected power is coherently detected by receiver 412 to provide real and imaginary components, i.e., complex baseband signals, to processor 460 after digitization in ADCs 450-1 and 450-2. The real (I) and imaginary (Q) values are then used by processor 460 to determine control signals for matching network 426 to reduce the magnitude of the reflected signals and thereby improve load impedance matching between transmitter 414 and antenna 422.

As was explained in the '368 patent, in some implementations it may only be necessary for processor 460 to characterize the reflected signal as resulting from a "good enough impedance match" or a match that is "not good enough", and in the latter case to perhaps quantize the reflection coefficient value into one of a limited number of regions indicating where on the Smith chart the impedance lies.

Figure 5:
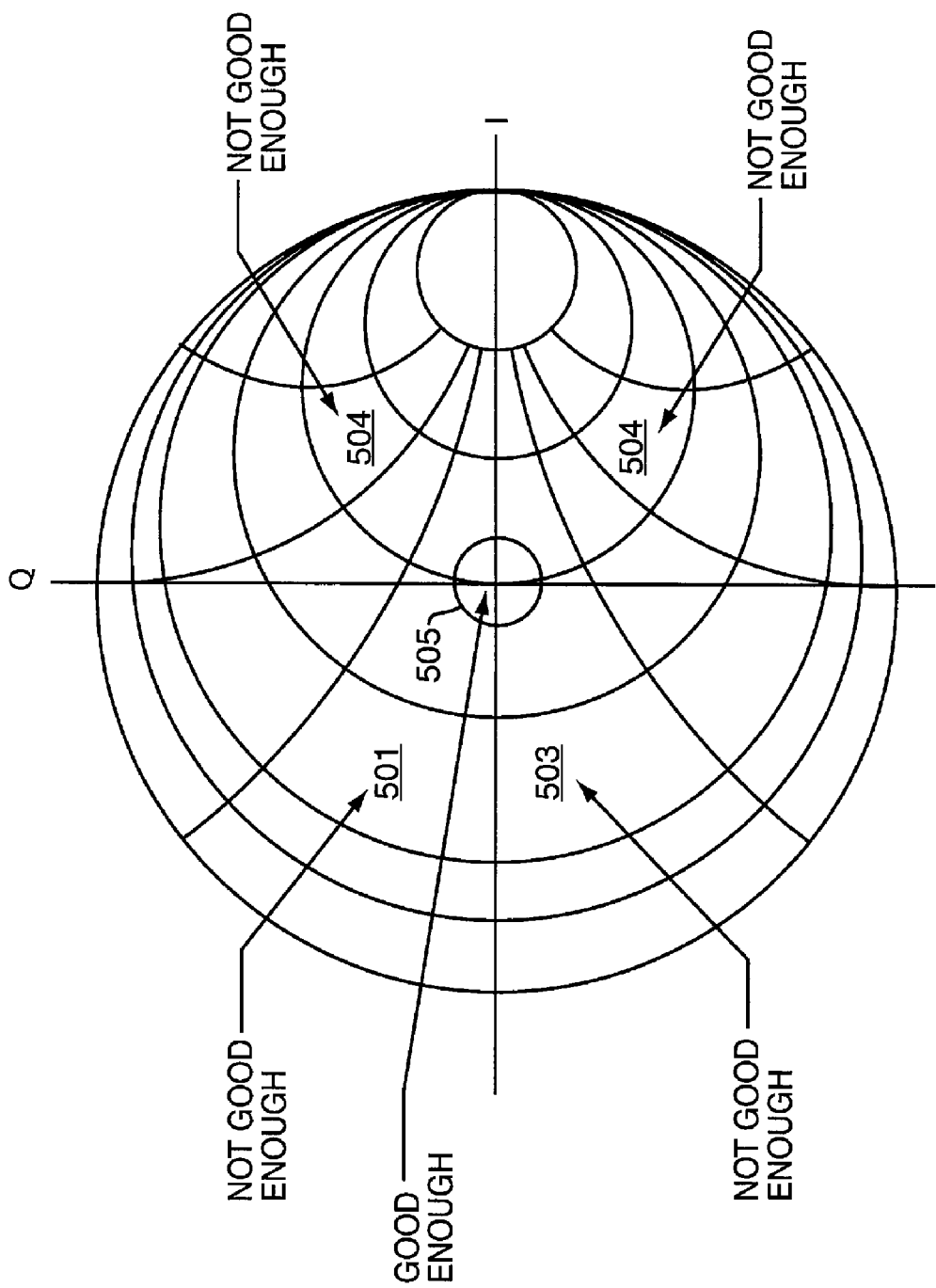
FIG. 5 is a graph of a Smith chart divided into five regions for characterizing antenna mismatch.

Accordingly, FIG. 5 illustrates a Smith chart divided into five regions corresponding to four "not good enough" regions, 501, 502, 503, 504, and a "good enough" region 505 in the center of the chart defined by the circle. The circle defining the "good enough" region 505 in this example corresponds to a reflection coefficient of 0.1, a return loss of −20 dB, and a VSWR of 1.2, which is postulated to be good enough for many cellular applications. The remainder of the Smith chart outside the "good enough" region 505 is classified into the four "not good enough" quadrants, which correspond respectively to the negative real parts of the reflection coefficient (regions 501 and 503); the positive real parts of the reflection coefficient (regions 502 and 504); the negative imaginary parts of the reflection coefficient (regions 502 and 501); and the positive imaginary parts of the reflection coefficient (regions 503 and 504).

The "coarse" quantizing of good enough/not good enough laid out in the '368 patent was made to simplify the reflected signal evaluation circuits. However, the use of homodyne receiver 412 (of FIG. 4) to provide reflected signal downconversion makes practical a fuller evaluation of impedance mismatch. That is, processor 460 may be used to make a more refined, or less coarse, characterization of the impedance mismatch than was suggested in the '368 patent, and to make, if desired, more precise adjustments of impedance matching circuit 426 to maintain relatively tight control of impedance mismatch.

While the reflection coefficient for the antenna-reflected transmit signals actually is the complex ratio of the reflected transmit signal to the forward transmit signal, FIG. 4 does not explicitly illustrate measurement of the forward transmit signal. Rather, FIG. 4 illustrates measurement of the reflected signal based on feeding back the reflected signals from directional coupler 418 to receiver 412. However the forward signal is known if the signal developed at the output of transmitter 414 is known, i.e., if its amplitude is known and the phase shift between local oscillator circuit 452 and the transmitter output is known. These factors can be calibrated for a given transceiver design or for a specific transceiver, and calibration information stored in transceiver 400. For example, calibration characterizations over a range of power levels (and frequency, if necessary) may be stored in memory circuits within the processor support circuits 462. Alternatively, receiver 412 may be configured with a third input on which it receives a coupled version of the transmitted signal. Processor 460 would then control receiver input selection to alternately downconvert the reflected signals and the forward signals, such that it has baseband samples of both and can thereby compute an accurate ratio of forward-to-reflected power. Such an approach would, in at least some cases, obviate the need for stored calibration tables. Thus, one might opt for a slightly more complex circuit implementation of transceiver 400, i.e., the use of forward and reflected signal feedback paths into receiver 412, or one might opt to calibrate transceiver 400 and store such calibration information in it.

In an exemplary embodiment, the frequency with which impedance matching adjustments are made is limited to once per TDMA frame, and the adjustments are based on classifying an average reflection coefficient over the transmit burst. Furthermore, as noted, adjustments are made when transceiver 400 is not transmitting, and generally are not made while it is receiving to avoid potentially interfering glitches. Such glitches are more likely where transceiver 400 couples its receiver 412 and transmitter 414 to antenna 422 through a duplexing filter circuit rather than through a transmit/receive switch. Impedance matching adjustments can also be limited to being made less frequently than once per TDMA burst, for example to once per 100 ms, by using processor 460 to determine the average mismatch region over several bursts on the same channel frequency. In a more general sense, then, processor 460 may change the rate at which it adjusts matching circuit 426 based on observing how much the mismatch varies over time. For example, on a given call, a user may not reposition his or her mobile station for seconds or minutes during use and, consequently, the antenna impedance may change very little over a given observation window. Under such conditions, processor 460 would back off on the rate at which it made impedance matching adjustments and could, for example, continue with its mismatch characterization operations and make a matching adjustment only when the observed mismatch exceeded a defined threshold.

Additionally, previously converged matching circuit settings may be remembered in non-volatile memory such as in EEPROM or FLASH memory in support circuits 462 or within processor 460. Such remembered settings may be stored in, for example, a table structure that contains settings versus operating frequency. These values may be recalled as initial values whenever transmission on a previously used operating frequency occurs.

Figure 6:
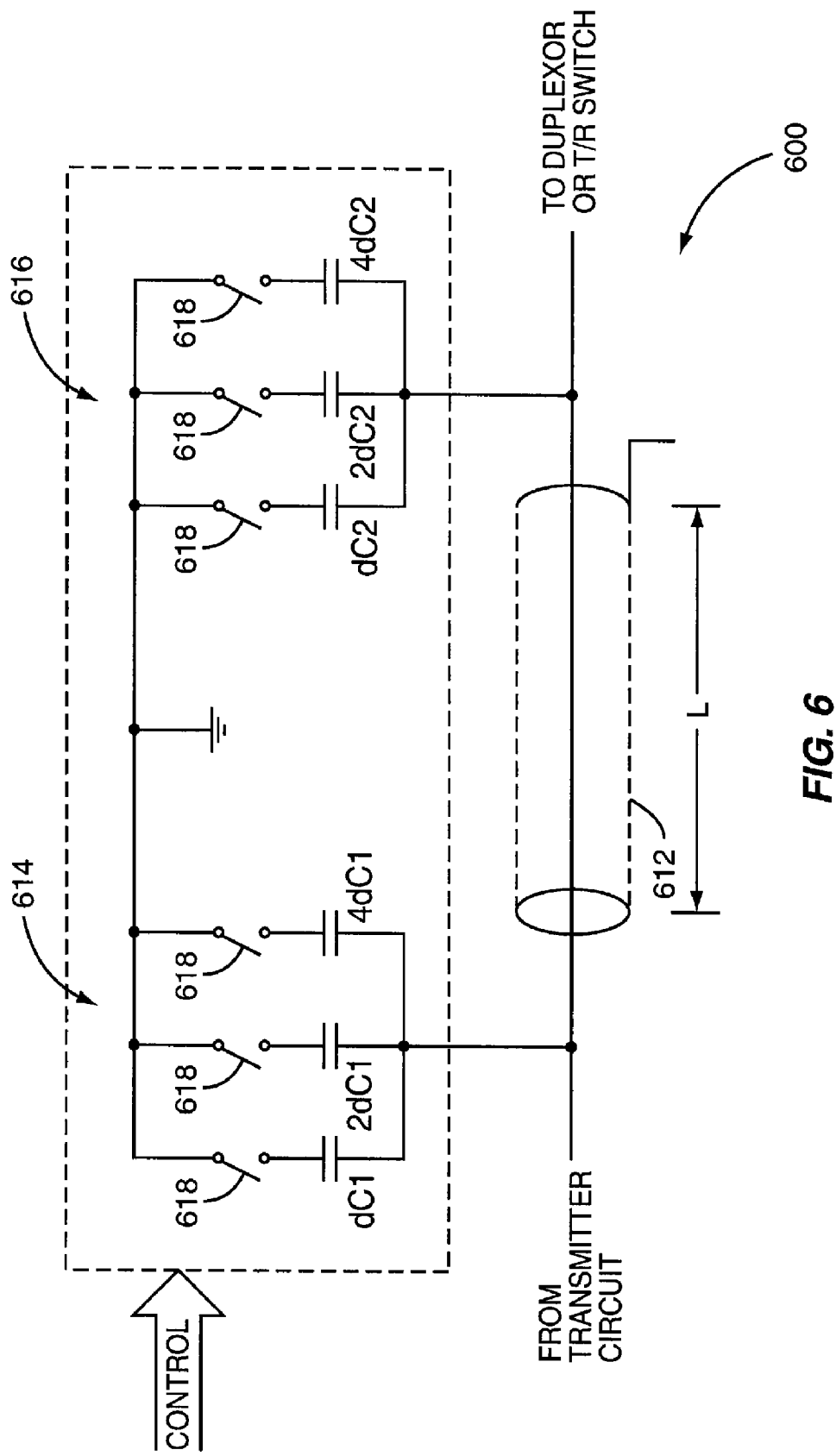
FIG. 6 illustrates a circuit arrangement for an exemplary adjustable antenna matching circuit.

FIG. 6 illustrates details of an exemplary variable matching network 600, which may be utilized for any of the matching networks previously described herein. Of course, those skilled in the art will appreciate that the matching circuit configuration of FIG. 6 is but one of many possible circuit configurations that may be used for matching one or more antennas to a receiver and/or transmitter circuit. In any case, matching network 600 includes a length L of transmission line 612, having characteristic impedance Zo, with first 614 and second 616 capacitor banks attached to ground at either end of the transmission line 612. When the characteristic impedance Zo of the transmission line 612 is greater than the target matched impedance (e.g., 50 ohms) and its length L is less then one quarter wavelength, its influence is similar to that of a series inductance, and hence the network is operable similar to a Pi-network.

Each of the first 614 and second 616 capacitor banks includes three parallel capacitors connected to ground via respective switches 618, with each capacitor having its own switch 618. The first bank of capacitors 614 is in a binary ratio of dC1:2dC1:4dC1, where dC1 represents a minimum change in capacitance. Similarly, the second bank 616 of capacitors is in a binary ratio of dC2:2dC2:4dC2, where dC2 is also a minimum change in capacitance. Thus, the capacitance associated with the first 614 and the second 616 capacitor banks is variable from 0 to 7dC1 and from 0 to 7dC2, respectively, upon operating the respective switches 618 associated with each capacitor. PIN diodes, FET switches, MEM switches, relays, or other switching devices may be utilized for switches 618.

In some embodiments, coarsely quantized reflection coefficient values may be sufficient for processor 460 to determine, based on preprogrammed rules, whether to increase or decrease either of the capacitances or both by a minimum step dC1 or dC2, respectively. In any event, the preprogrammed rules ensure that the decided action generally results in a movement of the impedance towards and preferably into the "good enough" region 505 of FIG. 5. The preprogrammed set of rules is but one of a preset number of all possible sets of rules. The number of possible sets of rules is determined by selecting one of the possible actions (−dC1, 0, dC1) combined with (−dC2, 0, dC2) for a total of nine possible actions for each of the four regions 501-504, and for each of the sixty-four possible pre-existing capacitor states results in a total of 64×94 sets of rules. The selection of one of these sets of rules is independent of the choice of antenna or mobile phone, and can be determined by simulation techniques. The 64×4 values of the decided capacitance changes can be combined with the pre-existing (1 of 64) capacitor switch states to determine the new capacitor witch state after the change, with the six switch control bits required to program the switch state stored in a 256-byte look-up table. One such table would be required for each frequency band in which operation of the mobile phone is desired.

In other embodiments, a more detailed characterization of the refection coefficient may be carried out, using the homodyne converter circuit 442 and processor 460 and an embedded program configured to compute the exact values of C1 and C2 needed to perfect the impedance match. Processor 460 may then select the nearest available values of C1 and C2 to the ideal values.

Figure 7:
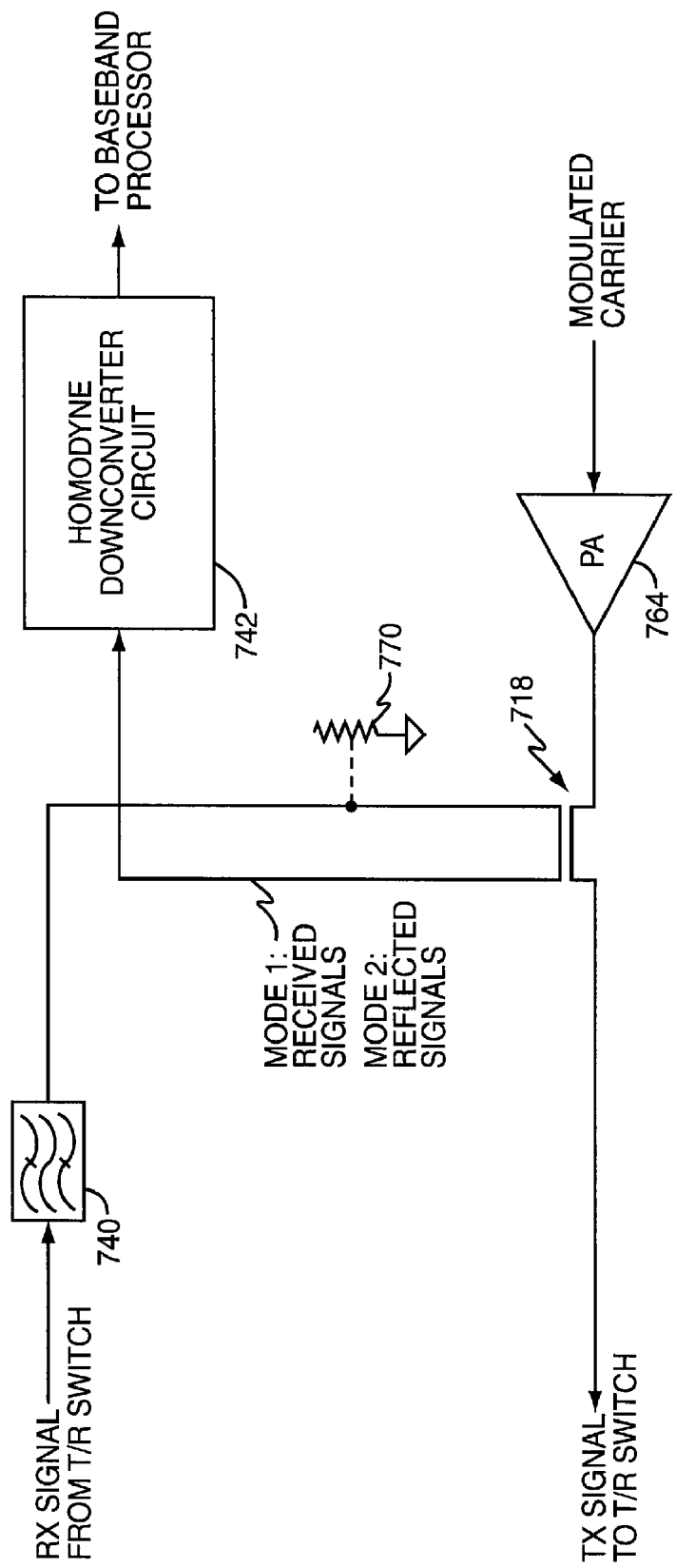
FIG. 7 illustrates an exemplary signal-coupling arrangement for antenna-received and antenna-reflected signals.

FIG. 7 shows an alternative coupling arrangement that offers minimal parts count and reduced circuit space. Coupler 718 may be implemented, for example, as a pair of appropriately spaced parallel traces on a printed circuit board (PCB). The depicted coupling arrangement obviates the need for dual, selectable inputs into the receiver circuitry. That is, homodyne downconverter circuit 742 may be implemented with a single input amplifier coupled to filter 740 through directional coupler 718, as shown. More particularly, the output from the receiver filter 740 is coupled to homodyne converter circuit 742 via the "through" path of directional coupler 718, which is a low-loss path. When the T/R switch is operated to connect PA 764 to the antenna, there is no signal from the antenna to filter 740. However, transmit signals reflected from the antenna and the antenna matching circuit are coupled by directional coupler 718 to the homodyne downconverter.

Forward-traveling transmit signals are also coupled by directional coupler 718 toward receive filter 740. Therefore, if the receive filter 740 is not absorptive (i.e., is not a good 50 Ohm termination) at the transmit frequencies of interest, these forward signals would be reflected from filter 740 into homodyne converter circuit 742, potentially confusing them with the antenna-reflected signals. If filter 740 is completely reflective at the transmit frequency, a 50 ohm load 770 should be switched across the signal lines, e.g., printed circuit board traces or wires, between filter 740 and directional coupler 718 at a point, as indicated by dashed lines, at a point where the phase of the reflection coefficient represents a high impedance.

Another notable aspect regarding the arrangement depicted in FIG. 7 is that directional coupler 718 may be configured to impart a desired attenuation to the antenna-reflected signals input to homodyne downconverter circuit 742. That is, the amplitude of the antenna-reflected signals may be expected to be higher than that of the typical antenna-received signal. Thus, attenuation of the antenna-reflected signals may be desirable to bring them within the signal range appropriate for the receiver's sensitivity.

Figure 8:
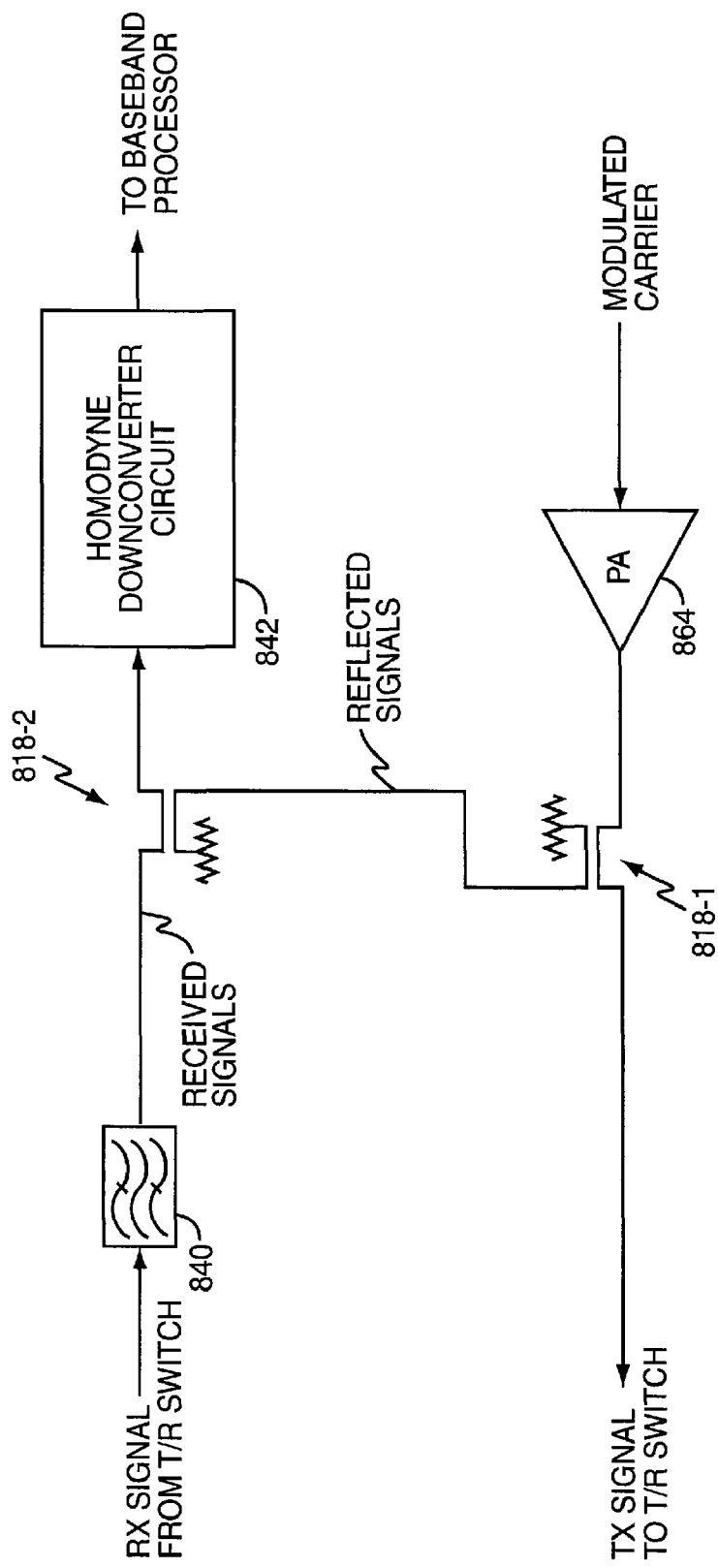
FIG. 8 illustrates another exemplary signal-coupling arrangement for antenna-received and antenna-reflected signals.

FIG. 8 illustrates another exemplary embodiment for coupling reflected signals into a homodyne receiver 842. Here, the reflected signals are coupled out of the transmit signal path using coupler 818-1 and then coupled into the homodyne receiver path using coupler 818-2. With this arrangement, the reflection coefficient of receive bandpass filter 840 at the transmit frequency is unimportant. If a coupling attenuation of 30 dB in total is required, for example, then both coupler 818-1 and 818-2 may be −15 dB couplers. Given an output power from PA 864 of 1 watt (+30 dBm), then −30 dB of coupling would inject 0 dBm (1 milliwatt) into the homodyne downconverter circuit 842 if the antenna was completely reflective, i.e., all power reflected back, or would inject −20 dBm if the antenna VSWR was 1.2.

Since an exemplary homodyne receiver 842 might have a receive sensitivity on the order of −100 dBm, there is ample sensitivity to sense antenna-reflected signals even when the PA 864 is operated at less than its full power output. However, the homodyne downconverter circuit 842 may exhibit DC offsets on its I and Q outputs that are significant compared to the baseband signal level, particularly when the antenna reflection coefficient is low, or when PA 864 is operating at low transmit powers. These DC offsets may be learned by recording the I/Q values obtained with the PA switched off. These learned offsets may then be subtracted from the I/Q values when the PA is switched on. Thus, the baseband processor may be programmed to detect and store the receiver's I/Q DC offsets, and then "null" the effects of any such offsets using the stored values. To this end, the baseband processor may be programmed to refresh its stored offset values over time, such as by measuring and storing offsets at spaced-apart time intervals to account for varying temperature, etc.

Figure 9:
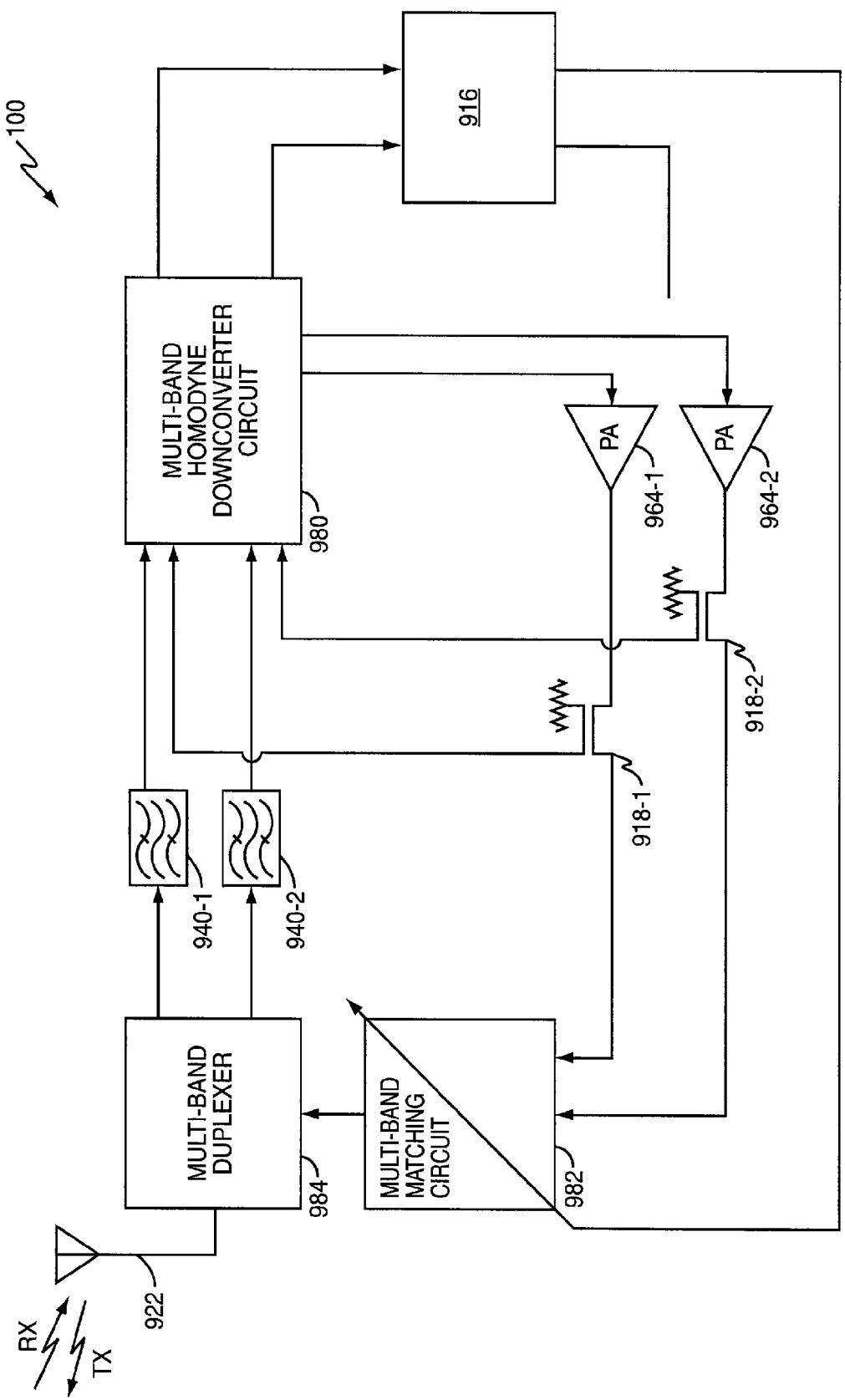
FIG. 9 illustrates an exemplary multi-band transceiver according to some embodiments of the invention.

In FIG. 9, transceiver 100 is implemented as a "multi-band" transceiver, and thus includes selective bandpass receive filters 940-1 and 940-2, each passing a different frequency band, and both feeding into a multi-band homodyne downconverter circuit 980, which may be patterned on the earlier-illustrated downconverter circuit 442, but with multi-band filters. Multi-band transceiver 100 further includes two or more PA circuits 964-1 and 964-2, a multi-band matching circuit 982, and a multi-band duplexer 984 connected to antenna 922. As in the single band embodiments described earlier herein, matching circuit 982 may be integrated with duplexer 984.

PA circuits 964-1 and 964-2 are coupled to matching circuit 982 through directional couplers 918-1 and 918-2, respectively. Thus, coupler 918-1 feeds back antenna-reflected signals for the transmit frequency band associated with PA circuit 964-1, while coupler 918-2 performs the same function, but does so for antenna-reflected signals associated with a second transmit frequency band. Of course, if transceiver 100 is intended to operate at more than two transmit frequency bands, additional PA circuits 964 and couplers 918 could be used. (The same comment applies to adding bandpass filters 940 as needed to accommodate additional receive frequency bands.) In any case, as before, the directional couplers 918 separate the antenna-reflected signals and route them to the appropriate input of the multi-band homodyne downconverter circuit 980 for coherent detection and resolution into complex baseband samples for processing at baseband processor 916. As such, any of the variations mentioned above for single-band embodiments of transceiver 100 may also be applied to multi-band embodiments of transceiver 100.

Figure 10:
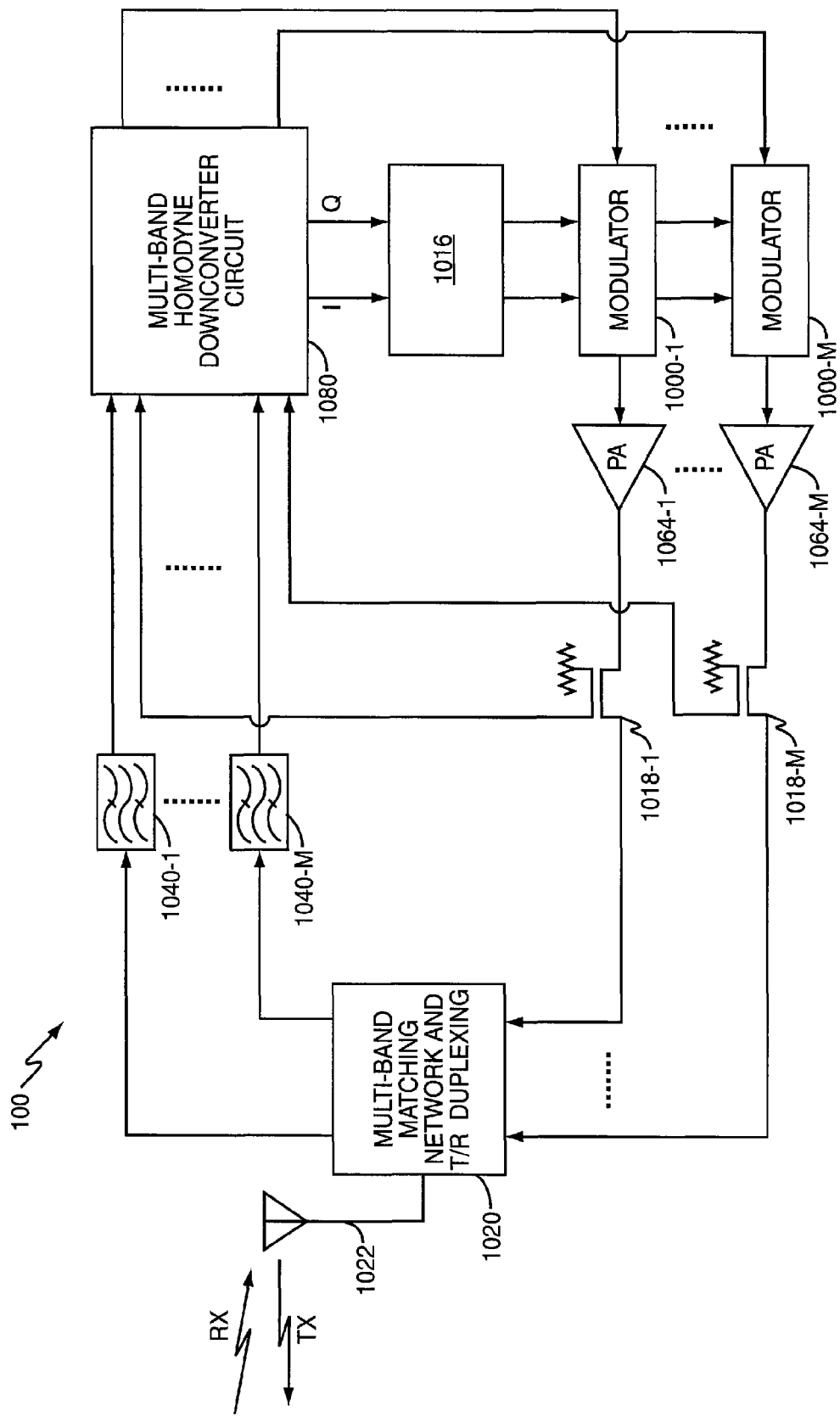
FIG. 10 illustrates another exemplary multi-band transceiver according to some embodiments of the invention.

FIG. 10 illustrates an exemplary embodiment of transceiver 100 that has particular applicability in systems that use non-constant-envelope modulation. As was the case with FIG. 9, transceiver 100 is implemented as a "multi-band" transceiver, and here includes selective bandpass receive filters 1040-1 to 1040-M, each passing a different frequency band, and both feeding into a multi-band homodyne downconverter circuit 1080. Multi-band transceiver 100 further includes two or more PA circuits 1064-1 to 1064-M, and an integrated multi-band matching and duplexer circuit 1020 connected to antenna 1022. PA circuits 1064-1 to 1064-M are coupled to matching and duplexer circuit 1020 through directional couplers 1018-1 to 1018-M, respectively. Thus, for example, coupler 1018-1 feeds back antenna-reflected signals for the transmit frequency band associated with PA circuit 1064-1.

With this arrangement, the local oscillator circuit(s) of homodyne downconverter circuit 1080 is not used to provide a modulated transmit signal, although it may still be returned during transmit mode to provide an unmodulated carrier signal at the desired transmit frequency. Thus, the unmodulated transmit signal from the local oscillator circuit in homodyne downconverter 1080 is output to each of transmit modulators 1000-1 through 1000-M, where there are "M" transmit frequency bands, and M essentially is any practical number, e.g., 2, 3, and so on. (Note that this arrangement is completely applicable to the single-band embodiment of FIG. 4 as well.)

Processor 1016 generates modulation signals, such as I/Q modulation signals. The modulation may modulate the phase of the transmit signal and thereby the phase of the reflection signal relative to the unmodulated local oscillator. Thus the I/Q signals from the homodyne downconverter 1080 comprise the reflected signal rotated in phase by the modulation. That is, if transmit signal modulation is applied to the transmit signal and that same modulation is not applied to the mixers in homodyne downconverter circuit 1080, then downconversion of the antenna-reflected signals will not be coherent with respect to transmit signal modulations. However, since the modulation was produced by processor 1016, and therefore known to it, the phase rotations appearing in the baseband samples may be removed by dividing the resolved reflected signal I/Q components by the I/Q modulation components. That is, the processor 1016 may store, at least temporarily, the modulation components used to generate the transmit signal, and then use those stored components (plus any stored phase transmitter-to-receiver phase shifts) to remove the effects of transmit signal modulation from the baseband samples of the antenna-reflected signals. The resulting demodulated reflected signal components may then be averaged over several modulation symbols. DC offsets present on the homodyne downconverter I/Q outputs are rotated by the process of removing the modulation, and therefore average to zero over a number of modulation symbols, thereby increasing the dynamic range of reflected signals that can be accurately evaluated.

Further developments of the above-described transceiver implementations are now described, taking account of various developments in wireless communications, including the more widespread use of duplex CDMA protocols; the increasing use of Orthogonal Frequency Division Multiplexing (OFDM) technology; the use of more complex linear modulation schemes; and the more widespread use of antenna diversity technology.

Most CDMA protocols are Frequency Division Duplex protocols (FDD), meaning that the transmitter and receiver operate simultaneously, in separate frequency bands, and are connected to the antenna system by duplexing filters rather than through a transmit-receive switch, as is possible in TDMA systems using TDD. When the receiver is operating on a different frequency than the transmitter, and is in use for receiving user data (such as digitized telephone voice signals), it is unavailable for measuring antenna reflection coefficient. Those skilled in the art will appreciate that this is a similar issue to that of the use of the receiver in CDMA cellphones to scan other base stations during conversation. It is useful for handoff purposes for the cellphone to inform the network of the base station it can receive most strongly, the procedure being known as "mobile assisted handover" or MAHO for short.

MAHO is used in the GSM TDMA system, but not in the IS-95 CDMA system. However, the 3G UMTS (WCDMA) system includes a special mode, known as compressed mode, which a mobile phone can temporarily adopt to make MAHO measurements. In the compressed mode, transmissions are time-compressed to about half their normal period, with the forward and reverse links using different halves of the period. This frees the receiver for half the time to perform MAHO measurements.

In some embodiments of the present invention, a mobile phone may be configured to also use compressed mode for performing antenna reflection coefficient measurements. These may be performed during a period for which compressed mode was already invoked to perform MAHO measurements, or may be invoked independently of the need to perform MAHO measurements. An alternative, which may be used without invoking a compressed mode, is to "steal" receiver time during a period when the cellphone is principally engaged in transmitting uplink traffic, e.g. in a telephone call when the cellphone user is talking and the other user is silent, or during a data protocol when receive data is not expected. Since it requires very little time to make an antenna reflection coefficient measurement, perhaps only 100 microseconds, stealing receiver time for such a short period may be permissible in some applications.

Stealing receiver time for antenna reflection coefficient measurements, whether utilizing compressed mode or not, involves tuning the transceiver's receiver to receive its own transmitter frequency, rather than the frequency of a base station. In the case of a homodyne receiver, this may involve using the frequency synthesizer that generates the transmit carrier frequency signal as the local oscillator for the homodyne downconverter. Of course, a separate, relatively low-sensitivity homodyne downconverter may be used, such that the downconverter is more or less permanently driven by the transmit carrier frequency synthesizer in order to measure antenna reflection coefficient at any desired moment; such a downconverter may occupy little chip area and may be a good trade-off relative to the switching circuits that would otherwise be needed for a single homodyne downconverter to select between receive and transmit local oscillators. Moreover, using a separate homodyne downconverter for antenna reflection coefficient measurement allows the main receiver to be a conventional non-homodyne receiver, if desired. As it is generally desired to minimize the additional circuitry required to perform antenna reflection coefficient measurements, the same analog-to-digital converters and baseband filters may be used to convert the homodyne output to the digital baseband, if a period is available for diverting their use from normal traffic reception. In any case, however organized, the antenna system in some embodiments of the invention has a first mode in which signals are provided to be downconverted by a receiver to digital baseband samples containing downlink traffic information, and a second mode in which signals are provided to a receiver for downconversion to digital baseband samples containing reflection coefficient information. In the second mode, the digital baseband samples are processed together with digital baseband samples of the transmit modulation in order to determine antenna reflection coefficient values that are compensated for the modulation.

The definition of antenna reflection coefficient is the complex ratio of the reflected voltage wave complex amplitude to the forward voltage wave complex amplitude applied to the antenna. If the antenna is a short circuit, the net voltage at the antenna is zero and thus the reflected wave amplitude is the negative of the forward wave amplitude, giving a ratio −1. For an open circuit, the ratio is +1. To discriminate between the two, and for all mismatches in between, it is necessary to be able to discern the phase of the reflected wave relative to the phase of the forward wave. When the reflected wave is modulated and the receiver local oscillator is not, the transmit modulation is superimposed on the reflection coefficient, masking its phase. However, since the complex value of the transmit modulation signal is known within the transceiver's processor, the digital base band samples from the receiver may be processed to compensate for the modulation. This may be done in several ways.

First, the definition of reflection coefficient $\Gamma$ is $$\Gamma = \frac{V_{REFLECTED}}{V_{FORWARD}}, \quad (1)$$

where $V_{REFLECTED}$ is the instantaneous complex value of the reflected wave and $V_{FORWARD}$ is the instantaneous complex value of the forward wave. Calculated values of $\Gamma$ may be averaged over several measurements made during the measurement period. In some embodiments, $V_{REFLECTED}$ may be measured from downconverted digital baseband samples, while $V_{FORWARD}$ is estimated from the corresponding transmit baseband samples already known to the transceiver's processor and transmitter power information, such as a nominal transmitter power setting. In some embodiments, the resultant value of $\Gamma$ may then need to be corrected for any known amplitude scaling and phase shift through the transmitter to the point at which the reflected wave is tapped off, using a directional coupler. Alternatively, the estimated value for $V_{FORWARD}$ may be corrected based on this known transceiver calibration information.

An equivalent expression to Equation (1) is given by:

$$\Gamma = \frac{V_{REFLECTED} \cdot V^*_{FORWARD}}{|V_{FORWARD}|^2}, \quad (2)$$

where $V^*_{FORWARD}$ is the complex conjugate of the forward incident wave amplitude. In another embodiment of the invention, the numerator and denominator of Equation (2) could be calculated separately and averaged separately, over several measurement observations, before calculating the value of $\Gamma$. This approach has the effect of weighting reflection coefficient values obtained at signal amplitude peaks more highly than values obtained at amplitude, and avoids the divide-by-zeros or near-zeros that could occur when the amplitude modulation causes very deep troughs in the transmitted signal.

In the preceding embodiment, errors may be caused due to inaccuracy in the value of $V_{FORWARD}$ at high transmit amplitudes, which may be caused, for example, by power amplifier clipping. Power amplifier clipping results in the forward wave applied to the antenna being lower than the value originally generated in the digital baseband. In some transceiver embodiments, predistortion techniques are used in the generation of the transmit modulation to compensate for amplitude compression in the power amplifier. In these embodiments, the un-predistorted modulation values may be used to avoid reflection coefficient calculation errors.

In some embodiments, perhaps as an alternative to employing un-predistorted values of $V_{FORWARD}$, values of $V_{FORWARD}$ and corresponding values of $V_{REFLECTED}$ may instead be selected from a plurality of available measurement values, so that the selected values lie in a mid-amplitude range between the peak values. The extreme values, which are avoided in these embodiments, include peak values, which may be clipped, and trough values, which may be distorted or otherwise unreliable. For example, an embodiment according to this approach might select only values of $V_{FORWARD}$ lying between −3 dB and −6 dB relative to the peak value of $V_{FORWARD}$ for use in determining the reflection coefficient $\Gamma$. Corresponding $V_{REFLECTED}$ values for each of the selected may be measured, based on the downconverted reflected signal.

In a CDMA system, the receiver normally de-spreads the received signal by correlating downconverted digital baseband samples with the CDMA spreading code over a symbol period. The result is a set of complex values at the slower symbol rate. The ratio of complex symbol values obtained from a reflected signal to the complex value of the symbol before spreading with the CDMA spreading code is also a measure of the reflection coefficient. Those skilled in the art will appreciate that this approach to determining the reflection coefficient is mathematically similar to the approach discussed above with respect to Equation (2). In this method, however, it may be necessary in some embodiments to correlate the downconverted received signal samples with more than one shift of the spreading code and to combine the results, to compensate for timing differences between the sampling instants of the receiver analog-to-digital converter and the transmit samples.

Figure 11:
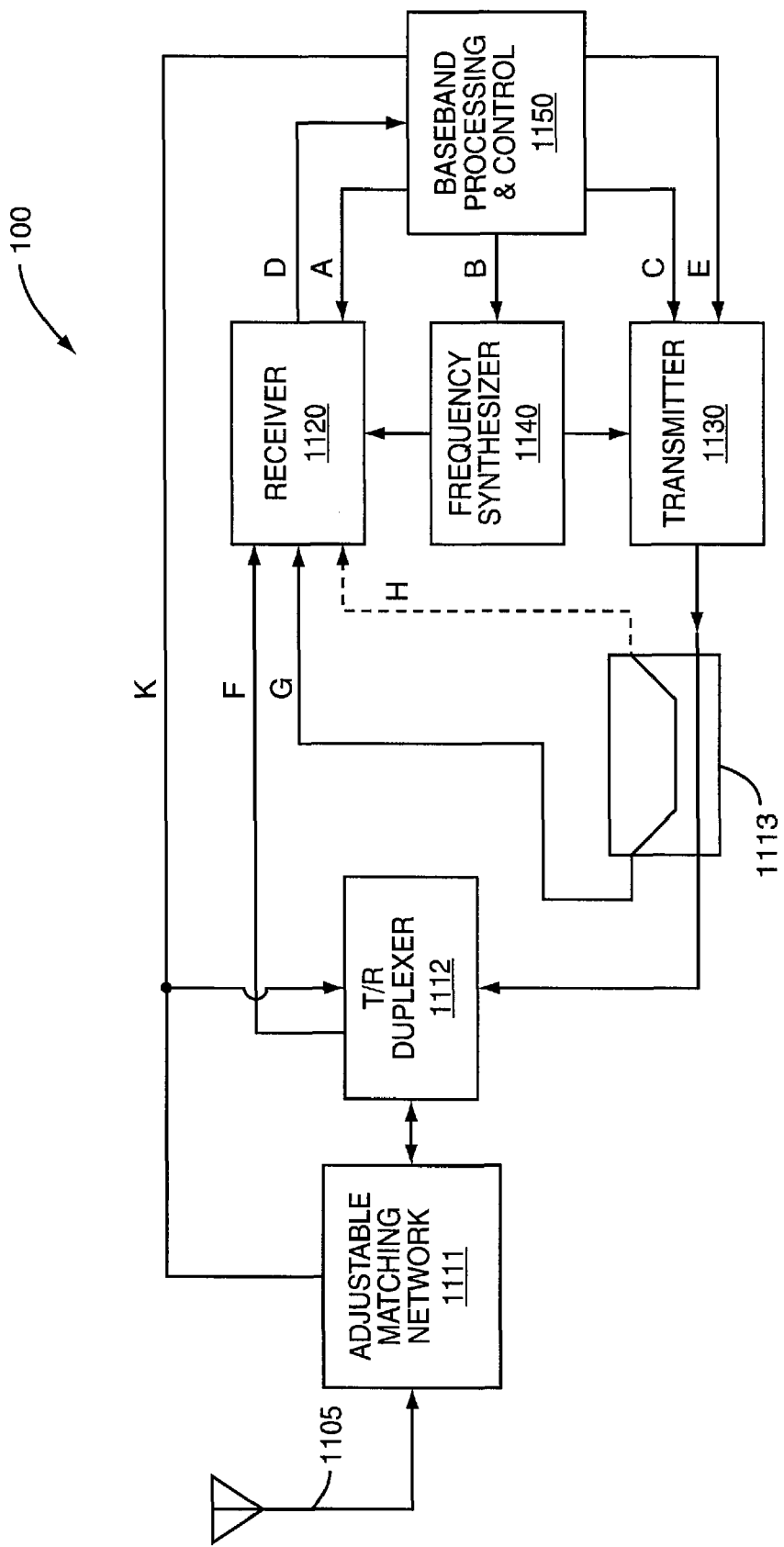
FIG. 11 is a generalized block diagram of a transceiver according to several embodiments of the invention.

FIG. 11 shows a block diagram of a transceiver 100 suitable for implementing the above-described matching methods. An antenna 1105 is coupled via an antenna system, which includes adjustable matching network 1111, T/R duplexing circuit 1112, and directional coupler 1113, to a receiver circuit 1120 and transmitter circuit 1130. In a first mode, the antenna system couples the receiver 1120, transmitter 1130, and antenna 1105 so that the receiver 1120 receives signals (on line F) from a wireless network, the signals having passed through T/R duplexer 1112. In a second mode, the antenna system couples transmitter 1130, receiver 1120 and antenna 1105 so that the receiver 1120 receives signals (on line G) from directional coupler 1113, which separates out the transmitter signal component that is reflected from the antenna system due to impedance mismatch. Optionally, the receiver may also receive (on line H), from directional coupler 1113, a sample of the forward transmitter signal wave traveling toward the antenna system. Frequency synthesizer 1140 generates a transmit carrier frequency signal that is fed to transmitter 1130 where it is modulated with digital baseband signals received (on line E) from baseband processing circuit 1150. Frequency synthesizer 1140 also generates local oscillator signals for receiver 1120.

One local oscillator signal that may be generated adapts the receiver 1120 to downconvert signals received from the antenna system in the first mode, corresponding to reception of user data traffic from the wireless network station. Another local oscillator signal that may be generated adapts the receiver to downconvert reflected transmitter signals coupled from the antenna system in the second mode. In some embodiments, the first and second operating modes discussed above may be simultaneous, or overlapping. Thus, in some embodiments, both local oscillator signals may be generated simultaneously, and in some embodiments the receiver may be operated to simultaneously downconvert received signals and transmitter signals reflected from the antenna system.

In some embodiments, receiver 1120 may comprise a homodyne downconverter for downconverting reflected signals; the same or a separate downconverter may be used for the received signals. In such an embodiment, the local oscillator signal used for downconverting the reflected signals may be the same signal used to generate the transmit carrier frequency signal. In various embodiments, this local oscillator signal may be the transmit carrier frequency signal before modulation is applied, the transmit carrier frequency signal after only the phase modulation part is applied, or the transmit carrier frequency signal after both amplitude and phase parts of the modulation, e.g. complex or (I/Q) modulation, have been applied. In the latter case, the downconverter in receiver 1120 may apply the local oscillator to a limiting input of the downconverting mixers, thereby suppressing or partially suppressing the amplitude part of the modulation. In any case, the transfer function of the selected design is known and may be used inside the digital signal processing unit 1150 to predict the downconverted signals that would be expected for different antenna reflection coefficients, thereby allowing the actual antenna reflection coefficient to be estimated.

Downconverted digital signal samples are passed (on line D) from the receiver to the digital signal processing circuit 1150. Baseband processing circuit 1150 may be configured to operate in a first mode to decode downconverted signals corresponding to network-originated user data traffic, i.e., received signals, and/or in a second mode to process downconverted transmitter reflected wave signals. Several different methods for processing reflected wave samples in the second mode to determine the reflection coefficient Γ were listed above; each of these approaches essentially comprises combining reflected wave samples with knowledge of the transmitter modulation signal that was applied to the transmitter (at input E), to compensate the reflected wave signals for the known transmitter modulation and thereby calculate an antenna reflection coefficient. This calculated antenna reflection coefficient is generally accurate, in phase and magnitude, apart from any scaling and phase offset determined by calibration of the specific transceiver design.

Having determined the antenna reflection coefficient, the baseband processing circuit 1150 may be configured to compute changes to adjustable matching network 1111 to improve the antenna matching. The changes are computed based on at least the reflection coefficient, but may also be based on a current operating state of the transmitter 1130, as well as the current state of matching network 1111.

Those skilled in the art will notice that in FIG. 11 the matching network 1111 is shown after the duplexer 1112, and is thus in both transmit and receive paths. This may be a desirable arrangement, especially if antenna impedance variation is correlated between the transmit and receive circuits, as would generally be the case in single-frequency TDD systems, where the T/R duplexer 1112 may comprise a T/R switch. If, however, it is not desired that the matching network 1111 affect the antenna impedance for the receiver circuit, then matching network 1111 may instead be located between T/R duplexer 1112 and directional coupler 1113.

Changes to the matching network are commanded by the digital signal processing circuits 1150 (using control line K). Baseband processor 1150 also controls the receiver 1120 (via line A), frequency synthesizer 1140 (line B), and transmitter 1130 (line C). Baseband processing and control circuit 1150 may comprise a mixture of digital signal processors adapted specifically for fast numerical calculation, hard logic and general microprocessors, all of which are orchestrated by suitable software programs. A specific set of software programs may be associated with performing antenna matching to ensure that antenna matching is performed at appropriate times and that the antenna system, synthesizer 1140, receiver 1120 and transmitter 1130 are operating in the correct modes. Such software may also contain calibration procedures configured to automatically determine the above-mentioned amplitude scaling and phase shift constants that may be needed to properly interpret processed reflected wave samples.

In general, it is desirable to be able to predict how a given change to matching network 1111 will affect the antenna reflection coefficient. This may be achieved in some embodiments of the invention by learning from past instances of matching system activity. One method that may be used is described below.

An unknown network to be calibrated, lying between the directional coupler 1113 and matching network 1111, comprises the duplexer 1112 and any wire lengths, and can be represented by four complex chain matrix parameters:

$$\begin{pmatrix} a & b \\ c & d \end{pmatrix}.$$

Any phase alteration of the reflection coefficient due to phase shift of the transmit carrier frequency signal through the transmitter, relative to the local oscillator signal applied to the receiver downconverter, may be incorporated into the chain matrix by absorbing a transmission line having half that phase shift into the unknown network. The factor of one half derives from the fact that the reflection coefficient phase changes by twice the one-way phase shift through a network. Moreover, any amplitude scaling of the reflected wave can be incorporated into the chain matrix by absorbing a bidirectional amplifier or attenuator into the unknown network. Thus, determining the four complex unknowns a, b, c, and d provides the necessary calibration data to be able to predict the result of a reflected wave measurement due to a matching network change.

Thus the admittance presented by matching network 1111 to the directional coupler 1113 is given by $$Y1=(a+bY)/(c+dY)=(1-P1)/(1+P1), \quad (3)$$

where Y is the antenna impedance reflected to the junction of the matching network 1111 and coupler 1113. If we assume that the matching network effects adjustment by means of switchable shunt capacitors, or susceptances of variable value jB, then switching in an extra susceptance jB changes Y to Y+jB yields a second equation:

$$Y2=(a+b(Y+jB))/(c+d(Y+jB))=(1-P2)/(1+P2) \quad (4)$$

If Y1 is determined at a time that the reflected power has been minimized, then Y is known to be a matched load, e.g., 20 mMho. Thereafter, obtaining four equations of types 1 and 2 using three different values of B gives four linear simultaneous equations, allowing a, b, c and d to be determined. Those skilled in the art will appreciate that such a calibration procedure may, in various embodiments, be performed only when changing frequency, or only at power-on, or even less frequently, such as only in the factory, or only when the user enters an initial set up mode for the phone.

The benefits arising from the above-described techniques become particularly clear when operation using Orthogonal Frequency Division Multiplex (OFDM) signals, or the closely related Single-Carrier Frequency Division Multiple Access (SC-FDMA) signals, is contemplated. In OFDM, a set of data symbols to be transmitted is subjected to a Fourier transform operation, which has the effect of creating a different frequency subcarrier for each symbol.

Figure 12:
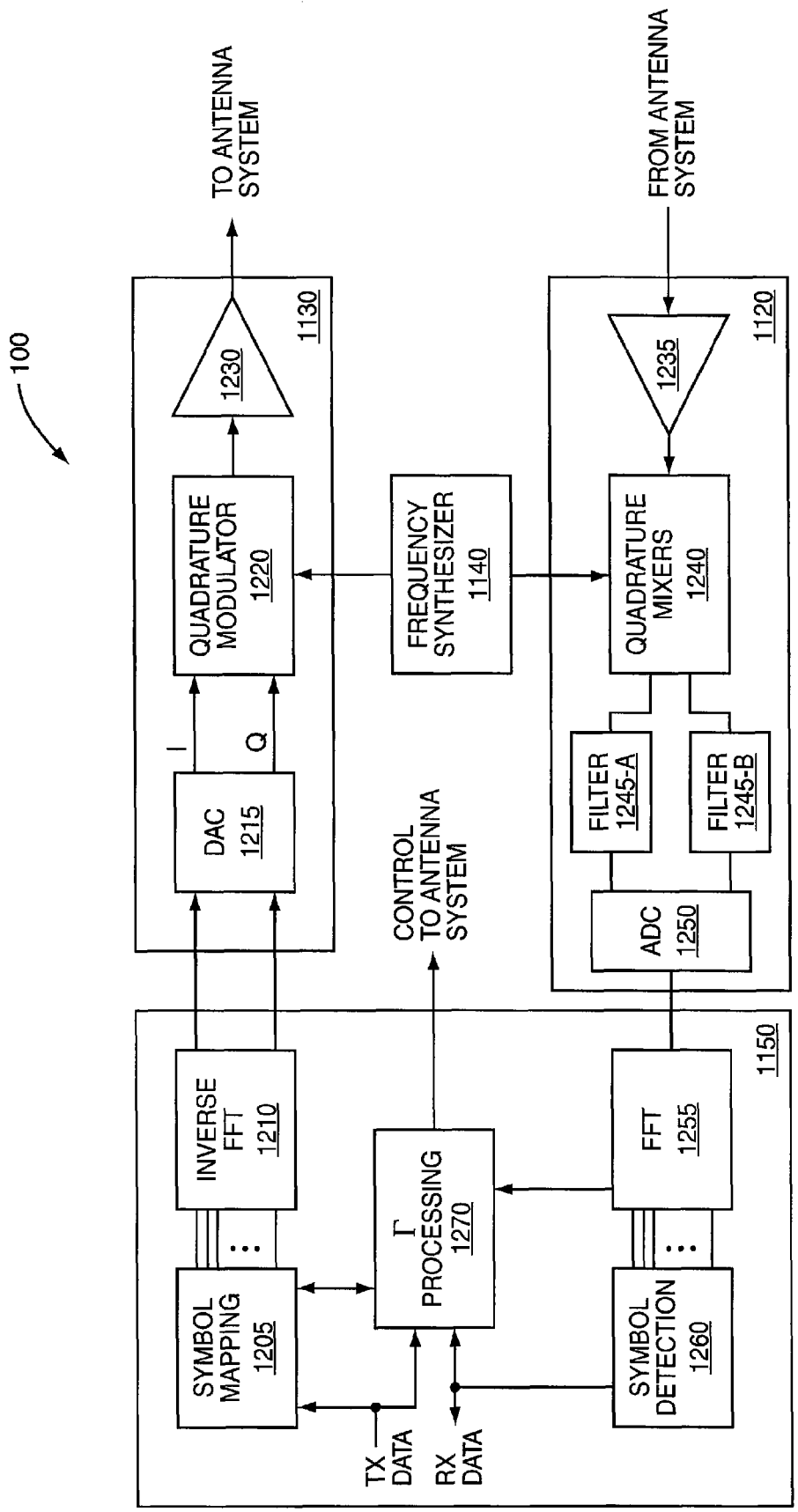
FIG. 12 illustrates signal processing of an OFDM signal according to some embodiments of the invention.

FIG. 12 shows the signal flow in an exemplary embodiment of a transceiver 100 configured for OFDM operation. Transmit data is mapped, by symbol mapper 1205, to a set of subcarriers. This mapping may use, for example, a 16-QAM modulation constellation, resulting in a series of complex numbers, which have in general different phases and different amplitudes, for each subcarrier. These complex numbers are transformed, using an inverse Fast Fourier Transform algorithm, into in-phase (I) and quadrature (Q) time-domain waveforms, at iFFT unit 1210. The I and Q waveforms are are converted from the sampled data domain of a numerical inverse-FFT to continuous waveforms at digital-to-analog converters (DACs) 1215. Not shown are various interpolation, digital filtering, and analog filtering operations that might be required in various embodiments of the invention; these techniques are well known to those skilled in the art. The I and Q waveforms respectively modulate cosine and sine transmit carrier frequency signals supplied by frequency synthesizer 1140, using quadrature modulator 1220. The modulator output is amplified in power amplifier 1230, and applied to the antenna through an antenna system such the antenna system described for FIG. 11.

Signals reflected from the antenna system due to mismatch are applied to the input of receiver 1120. Reflected signals are amplified by low-noise amplifier 1235, and then supplied to quadrature mixers 1240, which are driven with cosine and sine local oscillator signals from synthesizer 1140. The mixer outputs are filtered in I and Q filters 1245-A and 1245-B, and converted from analog to digital form in dual analog-to-digital converters (ADCs) 1250.

The digital samples of the reflected wave are supplied to digital signal processing 1150, where they are converted, using FFT unit 1255, from the time domain into frequency domain subcarriers; symbol amplitudes and phases for each subcarrier are determined using symbol detection unit 1260.

Reflection coefficient processing unit 1270 is supplied with the original transmitted data and/or the original mapped symbols, as well as a set of complex samples representing the reflected wave. The antenna reflection coefficient may easily be calculated therefrom. For example, the symbol values resulting from the FFT at 1255 should directly correspond to the symbol set generated by symbol mapper 1205, apart from a phase shift and amplitude change corresponding to the reflection coefficient of the antenna. This phase offset and amplitude change may be generally the same for each symbol if the antenna impedance is a slowly-varying function of frequency, except for a generally linear phase slope across the frequency band due to a time delay around the loop. The known phase of the original symbols may be removed from the received samples by de-rotation. It is also possible to remove the effect of different symbol amplitudes by dividing corresponding received symbol values with the original symbol amplitudes, both phase and amplitude normalization being simply described by R(i)/S(i) where R(i) is the i-th output of the receive FFT and S(i) is the original i-th symbol value. Any phase slope across the normalized values can be determined, for example by another Fourier transform operation, and removed. Thereafter, the result is a graphical representation of the antenna reflection coefficient magnitude over the signal bandwidth, which can be substantial in OFDM systems.

If there is substantial variation over the signal spectrum, the reflection processing unit 1270 can seek either to minimize the mean value, mean square value, or worst case value. As is the case with any signal waveform, a calibration procedure may be used to determine, for one or more frequencies in the transmit frequency band, a set of matrix values (a,b,c,d) which can be used to predict the effect of a matching network change on the antenna reflection coefficient, and thus aid control of the matching network to obtain the best match rapidly.

Those skilled in the art will appreciate that adding a second receive channel for downconverting the forward wave sample provided from a second directional coupler port eases calibration issues considerably. Assuming the two receive channels are reasonably well matched, the antenna reflection coefficient is simply the ratio of a reflected wave sample to a forward wave sample downconverted and sampled at the same time. Calibration may also be simplified by using a single receiver to select the forward wave signal from the directional coupler 1113 at times, in order to determine its phase and amplitude relative to the transmitter modulation signal. This is then used as a reference when evaluating the reflected wave at other instants.

A second receive channel may be available if the receiver is a diversity receiver, or may be provided as an additional, low-sensitivity downconverter specifically for antenna matching purposes. If the receiver is a diversity receiver, its two channels will be connected to respective diversity antennas during normal reception of user data traffic. If the transmitter is not a diversity transmitter, it will likely be coupled only to one of the two diversity antennas, which would therefore be the antenna to which the invention would be applied; i.e. the directional coupler and adjustable matching network would be in the path between the transmitter and the one antenna it feeds. If, on the other hand, the transmitter is also a diversity transmitter, having two power amplifiers feeding two antennas, then a complete duplication of the invention for each transmit channel may be used, to separately tune each antenna system. However, the two receive channels may be used for processing the forward and reflected wave for one transmitter-antenna pair at one instant, and for the second transmitter-antenna-pair at another instant, so that a single control algorithm matches the two antennas to their respective transmitters in different time periods. Thus it is generally not necessary to have four receiver channels, to handle two forward waves and two reflected waves, in such a diversity system. While it is unlikely that diversity transmission would be provided without diversity reception, a single receiver channel could in principle be used to process only the reflected wave of the first transmitter-antenna pair and the second transmitter-antenna pair in different time periods, or indeed to process the two reflected and two forward waves in four different time periods. It is also possible to determine the coupling between the two antennas by processing the forward wave to one in conjunction with the reflected wave form the other. This can be done when both transmitters are transmitting, if the modulation signals to each are sufficiently orthogonal, or if suitable compensation for non-orthogonality is applied in the numerical signal processing domain.

In the OFDM application just described, substantial signal processing may be employed to obtain reflection coefficient values compensated for the transmitter modulation type. Those skilled in the art will appreciate that many variations of the techniques described herein are possible, such as performing processing either in the frequency or the time domain, using Fast Fourier Transforms and Inverse Fast Fourier Transforms to switch between the two, or describing calibration values using 2-port matrix representations other than chain matrix (a,b,c,d) representations (e.g., scattering matrix representations). Those skilled in the art will appreciate that the above-described techniques are also directly applicable to SC-FDMA signals, which may be regarded as linearly precoded OFDM. These variations will be understood to all fall within the scope of the invention as described in the attached claims.

Those skilled in the art will further appreciate that several of the various circuits discussed herein, such as baseband processing circuit 1150, may be implemented using one or more microprocessors, microcontrollers, digital signal processors, and/or customized hardware, and may be implemented as a standalone chip or as part of an application-specific integrated circuit (ASIC) that includes other functions. The functions of one or more of the circuits described herein may be performed using two or more processing elements, in some embodiments, while the functions of two or more circuits may be performed using a single processing element in others.

Figure 13:
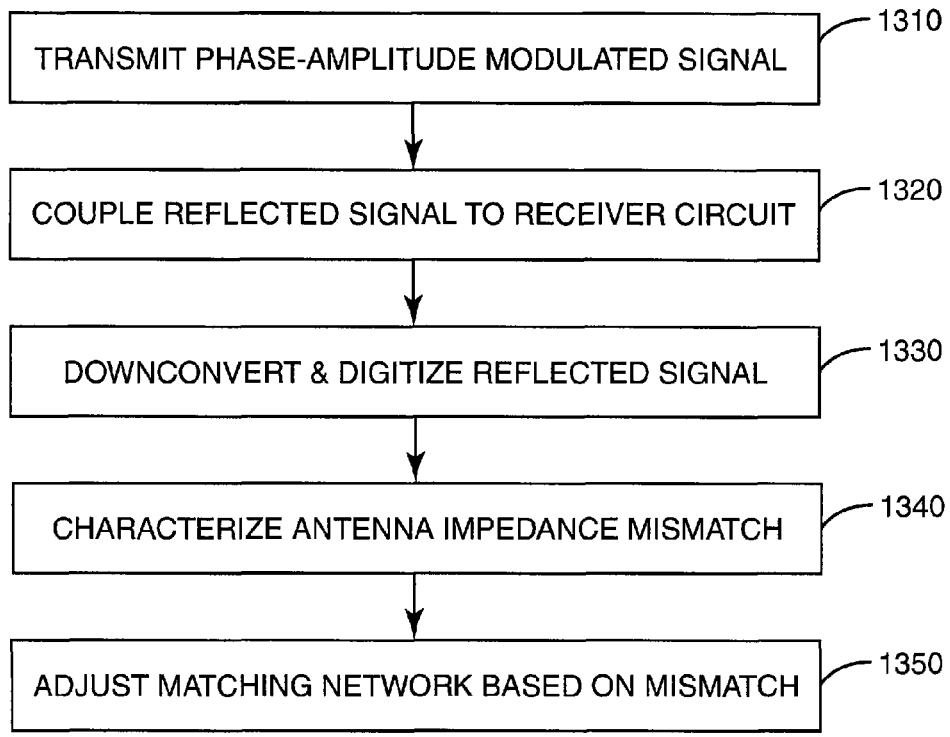
FIG. 13 is a logic flow diagram illustrating an exemplary method for automatically adjusting an antenna impedance match.

Signal processing circuits may comprise one or more programmable elements, programmed using software, firmware, or some combination of the two. The signal processing circuits may also include one or more elements that are hard-wired to carry out one or more of the techniques described herein. For example, FIG. 13 illustrates a method for automatically adjusting an antenna impedance match in a wireless transceiver; this method may be implemented in one or more of the transceivers described above, perhaps using a programmable baseband processing unit.

This exemplary method begins at block 1310, with the transmitting, via an antenna, of a signal generated from a phase-amplitude modulation signal. As discussed above, the transmitted signal may comprise an OFDMA or SC-FDMA signal, and may be modulated using one or more phase-amplitude modulation schemes, such as 16- or 64-QAM. In other embodiments, the transmitted signal may be a CDMA signal modulated using a phase-amplitude modulation scheme.

In any event, a portion of the transmitted signal is generally reflected from the antenna due to impedance mismatch between the transmitter circuitry and the antenna. This mismatch may vary over time due to environmental conditions, including the proximity of the antenna to a user's body. At block 1320, the reflected signal is coupled to a receiver circuit; the receiver circuit downconverts and digitizes the reflected signal at block 330. Those skilled in the art will appreciate that a coupling circuit, such as a directional coupler may be used to direct a portion of the reflected signal to the receiver circuit; this coupling may involve a significant attenuation of the signal, e.g. 15 dB or more. However, because the transmitted signal amplitude is generally much higher than the receiver sensitivity floor, such attenuation is acceptable, and may even be desirable to avoid overloading the receiver circuitry.

At block 1340, the antenna impedance mismatch is characterized, using the digitized baseband samples form the downconverted reflected signals as well as the phase-amplitude modulation signal that was used to create the transmitter signal. In this manner, the effect of the modulation can effectively be removed from the digital baseband samples, allowing an accurate characterization of the reflected signal amplitude and phase. At block 1350, an adjustable matching network is controlled in response to the characterization. For example, as was explained in detail above, one or more matching elements may be selectively connected, i.e., switched "in" or "out", in an antenna matching circuit. In some embodiments, various combinations of matching elements may be tried to determine an optimal configuration. In others, an optimal or advantageous setting may be derived directly from the characterized mismatch. For example, an estimated antenna reflection coefficient may be used to access a pre-determined matching network configuration stored in a look-up table.

In some embodiments, the antenna impedance mismatch is characterized by calculating an estimated reflection coefficient corresponding to the antenna mismatch. This may be done, for example, by dividing a complex signal value obtained from the digital baseband samples, indicating the reflected signal, by an estimated value for the forward signal incident at the antenna (or antenna matching circuit) interface. The latter may be obtained in some embodiments by combining the baseband processor's knowledge of the transmitted signal amplitude, calibration data reflecting phase shift and signal attenuation experienced by the reflected signal from the reflection interface through the receiver circuit, and the value of the transmitter modulation signal at a time corresponding to the digital baseband signal. Those skilled in the art will appreciate that the amplitude and phase of the forward wave may be estimated for any given time, given the above information.

Figure 14:
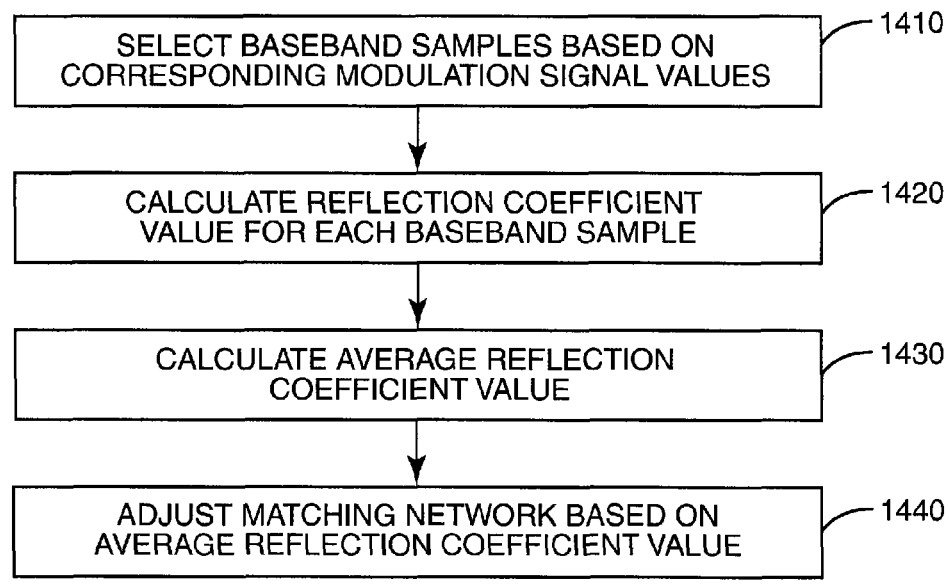
FIG. 14 is another logic flow diagram illustrating a method for adjusting an antenna impedance match.

In some embodiments, as was discussed above, a reflection coefficient may be calculated for each of several digital baseband samples, and averaged. A flow chart illustrating exemplary processing logic for such an embodiment is illustrated in FIG. 14.

At block 1410, several of the digital baseband samples discussed above are selected. Here, however, the particular samples are selected based on their corresponding modulation signal values. For example, the modulation signal may be evaluated to determine at what point or points the forward wave corresponds to an intermediate amplitude level. Digital baseband samples corresponding to this point or points are selected for further analysis. In this manner, signal peaks or troughs that might cause distorted or noisy measurements are avoided.

At block 1420, a reflection coefficient value is calculated for each of the selected baseband samples. At block 1430, the reflection coefficient values are averaged. At block 1440, the antenna matching circuitry is adjusted based on the calculated average.

As noted above, these illustrated methods and variations thereof may be implemented in transceivers of various configurations and supporting signals of various types. Similarly, other signal processing methods not explicitly illustrated in the drawings have been discussed above, and fall within the scope of the appended claims. Indeed, those skilled in the art will appreciate that the present invention may be carried out in other ways than those specifically set forth herein without departing from essential characteristics of the invention. The present embodiments are thus to be considered in all respects as illustrative and not restrictive, and all changes coming with the meaning and equivalency range of the appended claims are intended to be embraced within.

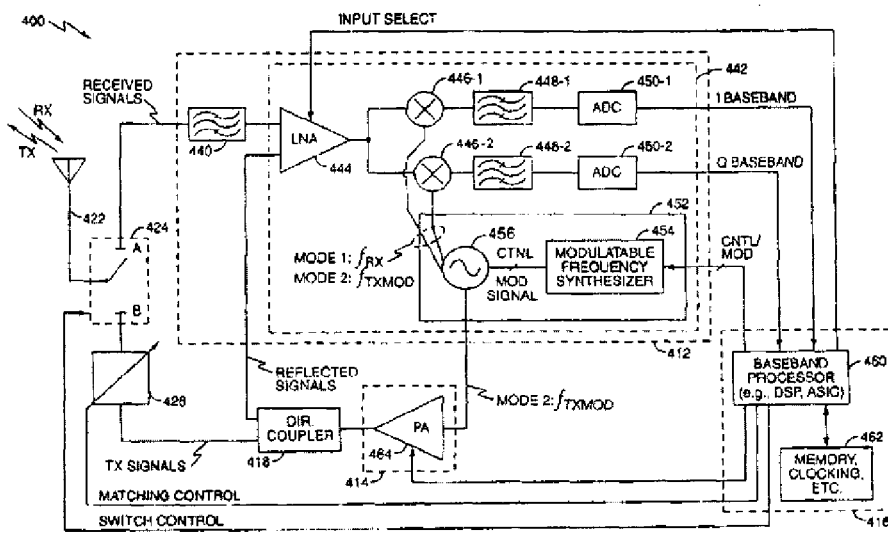

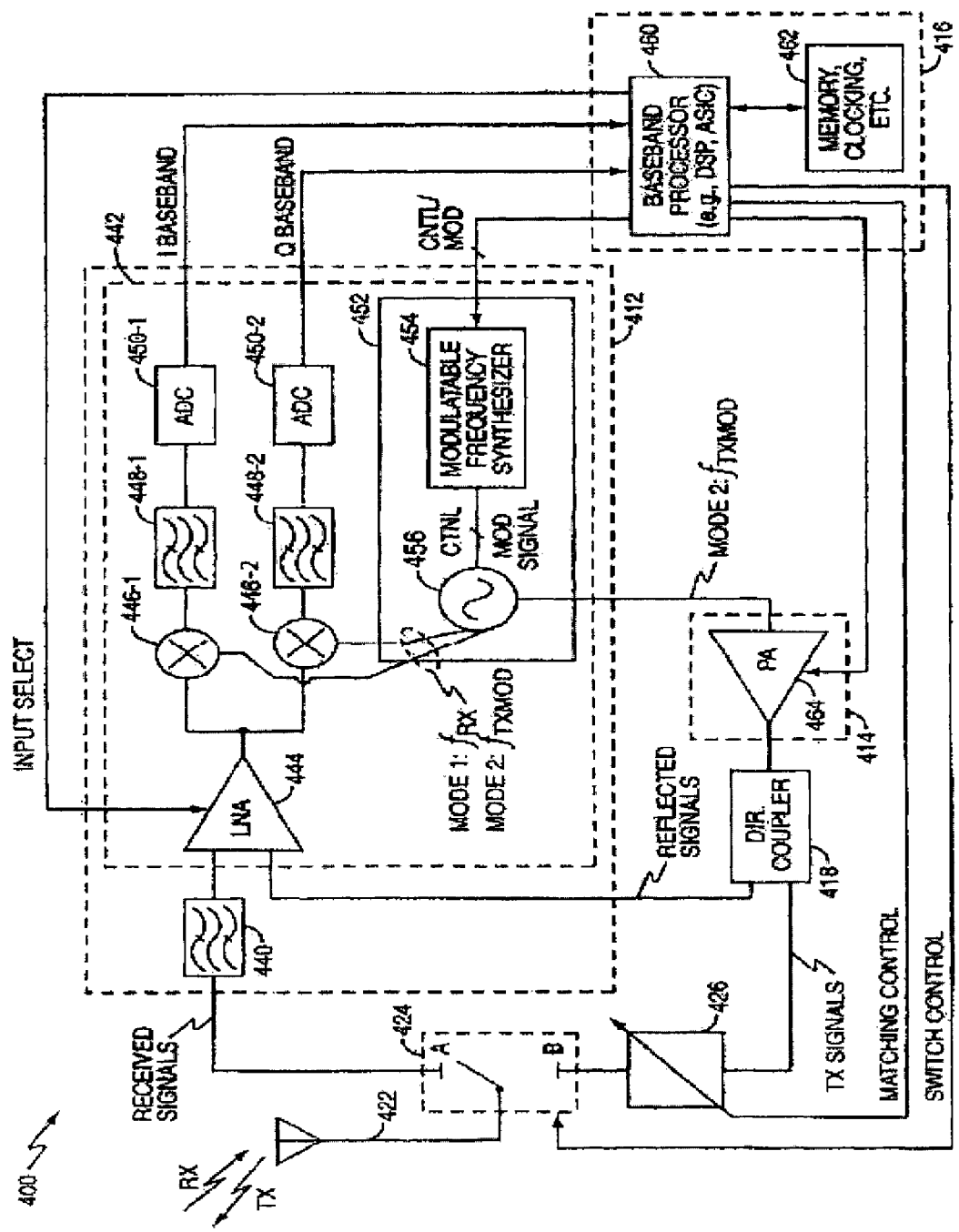

What is claimed is:

1. A wireless transceiver with automatic antenna impedance matching, the transceiver comprising:
   a transmitter circuit configured to generate a phase-amplitude modulated signal based on a phase-amplitude modulation signal;
   a receiver circuit configured to downconvert one or more input signals and to produce digital baseband signals from downconverted signals; and
   an antenna system configured to couple the transmitter circuit and the receiver circuit to an antenna, the antenna system comprising a coupling circuit configured to couple a transmitter signal reflected from the antenna to the receiver circuit and further comprising an adjustable matching network between the antenna and at least the transmitter circuit; and a baseband processor configured to process digital signals produced by the receiver circuit from the reflected transmitter signal to:

compensate the reflected transmitter signal using the phase-amplitude modulation signal to remove phase-amplitude modulation components in the reflected transmitter signal;

characterize an impedance mismatch between the transmitter circuit and the antenna based on the compensated reflected transmitter signal; and control the adjustable matching network based on the characterization.

2. The wireless transceiver of claim 1, wherein the receiver circuit comprises a downconverter circuit configured to, in a first mode, downconvert an input signal coupled from the antenna, and, in a second mode, downconvert the reflected transmitter signal.

3. The wireless transceiver of claim 1, wherein the receiver circuit comprises a first downconverter circuit configured to downconvert an input signal coupled from the antenna and a second downconverter circuit configured to downconvert the reflected transmitter signal.

4. The wireless transceiver of claim 1, wherein the phase-amplitude modulated signal comprises an Orthogonal Frequency Division Multiplexing (OFDM) signal or a Single-Carrier Frequency Division Multiple Access (SC-FDMA) signal.

5. The wireless transceiver of claim 1, wherein the phase-amplitude modulated signal comprises a Code Division Multiple Access (CDMA) signal.

6. The wireless transceiver of claim 1, further comprising a frequency synthesizer configured to supply a local oscillator signal, at the transmit frequency, to the receiver circuit and the transmitter circuit.

7. The wireless transceiver of claim 6, the antenna system further comprising a transmit/receive switch configured to couple the transmitter circuit to the antenna in a transmit mode and to couple the receiver circuit to the antenna in a receive mode, wherein the frequency synthesizer is configured to supply an unmodulated local oscillator signal during the receive mode and to modulate the local oscillator, using at least a phase portion of the phase-amplitude modulation signal, during the transmit mode.

8. The wireless transceiver of claim 6, wherein the local oscillator signal is unmodulated, and wherein the transmitter circuit comprises a phase-amplitude modulator configured to modulate the local oscillator, based on the phase-amplitude modulation signal, to generate the phase-amplitude modulated signal.

9. The wireless transceiver of claim 1, wherein the baseband processor is configured to characterize the impedance mismatch by calculating a reflection coefficient value as a function of a complex reflected signal value, derived from the digital baseband signal produced from the reflected transmitter signal, divided by an estimated forward transmitter signal value derived from the phase-amplitude modulation signal, and to control the adjustable matching network based on the reflection coefficient value.

10. The wireless transceiver of claim 9, wherein the baseband processor is configured to further characterize the impedance mismatch by averaging two or more reflection coefficient values and to control the adjustable matching network based on the average.

11. The wireless transceiver of claim 1, wherein the baseband processor is configured to select one or more samples from the digital baseband signal produced from the reflected transmitter signal, based on corresponding values from the phase-amplitude modulation signal, and to characterize the impedance mismatch based on the selected samples.

12. The wireless transceiver of claim 11, wherein the samples are selected to avoid peaks in the phase-amplitude modulated signal, troughs in the phase-amplitude modulated signal, or both.

13. The wireless transceiver of claim 1, wherein the phase-amplitude modulated signal comprises a Code Division Multiple Access (CDMA) signal, and the digital baseband signal produced from the reflected transmitter signal comprises a de-spread version of the reflected transmitter signal, and wherein the baseband processor is configured to characterize the impedance mismatch by comparing one or more de-spread symbols from the reflected transmitter signal to the corresponding symbols from the phase-amplitude modulation signal.

14. The wireless transceiver of claim 13, wherein the baseband processing circuit is configured to control the receiver circuit to successively de-spread the reflected transmitter at two or more different delays.

15. The wireless transceiver of claim 1, wherein the transmitter and receiver circuits are configured to selectively operate in a compressed mode, and wherein the baseband processor is configured to characterize the impedance mismatch during compressed mode.

16. The wireless transceiver of claim 1, wherein the baseband processor is configured to predict a time interval in which no received signal is expected, and to characterize the impedance mismatch during the predicted time interval.

17. The wireless transceiver of claim 1, wherein the baseband processor is configured to characterize the impedance mismatch based further on pre-determined calibration data characterizing the path traversed by the reflected transmitted signal.

18. A method for automatically adjusting an antenna impedance match in a wireless transceiver, the method comprising:

transmitting, via an antenna, a signal generated from a phase-amplitude modulation signal;

coupling a reflected portion of the signal from the antenna to a receiver circuit;

downconverting the reflected portion of the signal, using the receiver circuit, to obtain digital baseband samples; and processing the digital baseband samples to:

compensate the digital baseband samples to remove phase-amplitude modulation components present in the reflected portion of the signal;

characterize an antenna impedance mismatch based on the compensated digital baseband samples; and control the adjustable matching network based on the characterization.

19. The method of claim 18, wherein characterizing the antenna impedance mismatch comprises calculating a reflection coefficient value as a function of a complex reflected signal value, derived from the digital baseband samples, divided by an estimated forward transmitter signal value derived from the phase-amplitude modulation signal, and wherein controlling the adjustable matching network is based on the calculated reflection coefficient value.

20. The method of claim 19, wherein characterizing the antenna impedance mismatch further comprises averaging two or more calculated reflection coefficient values, and wherein controlling the adjustable matching network is based on the average.

21. The method of claim 18, wherein characterizing the antenna impedance mismatch comprises selecting one or more samples from the digital baseband samples based on corresponding values from the phase-amplitude modulation signal and characterizing the antenna impedance mismatch based on the selected samples.

22. The method of claim 21, wherein the samples are selected to avoid peaks in the reflected signal, troughs in the reflected signal, or both.

23. The method of claim 18, wherein downconverting the reflected portion of the signal comprises downconverting the reflected portion of the signal using a local oscillator signal tuned to the transmit frequency and modulated with at least a phase portion of the phase-amplitude modulation signal, such that the downconverting substantially removes phase modulation from the downconverted reflected signal.

24. The method of claim 23, wherein characterizing the antenna impedance mismatch comprises determining an amplitude portion of the phase-amplitude modulation signal and characterizing the antenna impedance mismatch as a function of the digital baseband samples and the amplitude portion of the phase-amplitude modulation signal.

* * * * *

UNITED STATES PATENT AND TRADEMARK OFFICE
CERTIFICATE OF CORRECTION

PATENT NO. : 8,351,874 B2
APPLICATION NO. : 12/099550
DATED : January 8, 2013
INVENTOR(S) : Dent et al.

It is certified that error appears in the above-identified patent and that said Letters Patent is hereby corrected as shown below:

In the Specifications

In Column 10, Line 36, delete "then" and insert -- than --, therefor.

In Column 13, Line 6, delete "returned" and insert -- retuned --, therefor.

In Column 19, Line 8, delete "are are" insert -- are --, therefor.

In Column 21, Line 43, delete "330." insert -- 1330. --, therefor.

Signed and Sealed this
Eleventh Day of June, 2013

Teresa Stanek Rea
*Acting Director of the United States Patent and Trademark Office*

UNITED STATES PATENT AND TRADEMARK OFFICE
CERTIFICATE OF CORRECTION

PATENT NO.         : 8,351,874 B2
APPLICATION NO.    : 12/099550
DATED              : January 8, 2013
INVENTOR(S)        : Paul Wilkinson Dent et al.

It is certified that error appears in the above-identified patent and that said Letters Patent is hereby corrected as shown below:

Delete the title page and substitute therefore the attached title page consisting of the corrected illustrative figure.

Delete Drawing Sheet 4 of 13 and substitute therefore with the attached Drawing Sheet 4 of 13 consisting of corrected FIG 4.

Signed and Sealed this
Seventeenth Day of September, 2013

Teresa Stanek Rea
*Deputy Director of the United States Patent and Trademark Office*

(12) United States Patent
Dent et al.

(10) Patent No.: US 8,351,874 B2
(45) Date of Patent: Jan. 8, 2013

(54) SYSTEM AND METHOD FOR ADAPTIVE ANTENNA IMPEDANCE MATCHING

(75) Inventors: Paul Wilkinson Dent, Pittsboro, NC (US); Sven Mattisson, Bjärred (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 886 days.

(21) Appl. No.: 12/099,550

(22) Filed: Apr. 8, 2008

(65) Prior Publication Data
US 2009/0253385 A1   Oct. 8, 2009

(51) Int. Cl.
    *H03C 1/52*   (2006.01)
(52) U.S. Cl. .......... 455/107; 455/126; 455/115.2; 455/69; 455/73; 455/550.1; 455/125; 330/129; 330/51; 330/151; 330/130; 330/149; 330/132
(58) Field of Classification Search .......... 455/550.1, 455/73, 121, 105, 107, 129, 115.1, 69, 125, 455/127, 126, 115.5, 127.1, 522.1, 80, 82, 455/114.2, 115.2; 375/130, 312, 219; 330/129, 330/51, 207, 130, 149, 151
See application file for complete search history.

(56) References Cited

U.S. PATENT DOCUMENTS

| | | | |
|---|---|---|---|
| 5,241,702 A | 8/1993 | Dent | |
| 5,423,082 A * | 6/1995 | Cygan et al. | 455/126 |
| 5,542,096 A * | 7/1996 | Cygan et al. | 455/115.2 |
| 5,568,520 A | 10/1996 | Lindquist et al. | |
| 5,614,904 A | 3/1997 | Dent | |
| 5,749,051 A | 5/1998 | Dent | |
| 5,834,987 A | 11/1998 | Dent | |
| 6,845,126 B2 | 1/2005 | Dent et al. | |
| 6,961,368 B2 | 11/2005 | Dent et al. | |
| 7,058,368 B2 * | 6/2006 | Nicholls et al. | 455/114.2 |
| 7,826,808 B2 * | 11/2010 | Faulkner | 455/114.2 |
| 2002/0101907 A1 * | 8/2002 | Dent et al. | 375/132 |
| 2003/0193997 A1 * | 10/2003 | Dent et al. | 375/219 |
| 2005/0025218 A1 * | 2/2005 | Briles | 375/130 |
| 2005/0042989 A1 | 2/2005 | Ho | |
| 2009/0130990 A1 * | 5/2009 | Rofougaran | 455/73 |

FOREIGN PATENT DOCUMENTS

| | | |
|---|---|---|
| DE | 10317599 A1 | 8/2004 |
| WO | 2004/098076 A1 | 11/2004 |

* cited by examiner

*Primary Examiner* — Jungpeng Chen
(74) *Attorney, Agent, or Firm* — Coats & Bennett, P.L.L.C.

(57) ABSTRACT

Methods and apparatus are disclosed for automatically adjusting antenna impedance match in a wireless transceiver employing phase-amplitude modulation. According to some embodiments of the invention, a wireless transceiver comprises a transmitter circuit and a receiver circuit connected to the antenna by a transmit/receive duplexer. An electronically adjustable matching network is located between the transmitter output and the antenna. To control the adjustable matching network, a directional coupler is located between the transmitter output and the matching network to separate transmit signals reflected from the antenna system, including the antenna, the matching network and the T/R duplexer. The reflected transmit signals are routed to the receiver circuit, which digitizes the reflected signal and determines an antenna reflection coefficient based on the digitized reflected signal and the modulation signal used to create the transmit signal. The complex antenna reflection coefficient is used to determine any adjustment needed to the antenna matching network.

24 Claims, 13 Drawing Sheets